United States Patent
Krishnan et al.

(10) Patent No.: US 11,182,815 B1
(45) Date of Patent: Nov. 23, 2021

(54) METHODS AND APPARATUS FOR A DISH RATING AND MANAGEMENT SYSTEM

(71) Applicants: Sarath Chandar Krishnan, Dublin, CA (US); Sivasubramanian Panneerselvam, Dublin, CA (US); Jayanthisri Chandrasekar, Dublin, CA (US); Archana Radhakrishnan, Dublin, CA (US)

(72) Inventors: Sarath Chandar Krishnan, Dublin, CA (US); Sivasubramanian Panneerselvam, Dublin, CA (US); Jayanthisri Chandrasekar, Dublin, CA (US); Archana Radhakrishnan, Dublin, CA (US)

(*) Notice: Subject to any disclaimer, the term of this patent is extended or adjusted under 35 U.S.C. 154(b) by 0 days.

(21) Appl. No.: 16/517,499

(22) Filed: Jul. 19, 2019

Related U.S. Application Data

(60) Provisional application No. 62/720,146, filed on Aug. 21, 2018.

(51) Int. Cl.
  *G06Q 30/02* (2012.01)
  *G06F 16/9538* (2019.01)
  *G06Q 50/12* (2012.01)

(52) U.S. Cl.
  CPC ..... *G06Q 30/0217* (2013.01); *G06F 16/9538* (2019.01); *G06Q 30/0215* (2013.01); *G06Q 50/12* (2013.01)

(58) Field of Classification Search
  CPC .................................................. G06Q 30/02
  (Continued)

(56) References Cited

U.S. PATENT DOCUMENTS 5,991,739 A * 11/1999 Cupps .................... G06Q 10/08
  705/26.61
8,903,708 B2 * 12/2014 Derks .................... G06Q 30/02
  704/2
(Continued)

FOREIGN PATENT DOCUMENTS

CN    107391531 B  *  4/2017  ......... G06F 16/9535
CN    111128342 A  *  12/2019  ............ G16H 20/60
(Continued)

OTHER PUBLICATIONS

Neural Restaurant-aware Dish Recommendation, Jin et al., 2020 IEEE International Conference on Knowledge Graph (ICKG).*
(Continued)

*Primary Examiner* — David J Stoltenberg
(74) *Attorney, Agent, or Firm* — Adibi IP Group, PC; Amir V. Adibi; Andrew C. Palmer

(57) ABSTRACT

A dish rating and management (DRM) system is provided that operates as a "closed-loop" system to maintain a database of dishes and associated numeric ratings. A user inputs selection criteria and is presented with dishes and associated ratings. The selection criteria include dish names, ratings, ingredients, and other criteria. The DRM system performs cross-reference dish discovery functions to establish a relationship between branded names and generic names to facilitate dish discovery by the user. Once the user selects a dish, the system processes an order for the selected dish that causes an order to be placed with a food provider that provides the selected dish. After the user has received the selected dish, the system queries the user for a numeric rating for the ordered dish. The database is updated with the numeric dish rating and the system provides a reward to the user for rating the dish.

21 Claims, 24 Drawing Sheets

(58) Field of Classification Search
USPC .......................................................... 705/14.1
See application file for complete search history.

(56) References Cited

U.S. PATENT DOCUMENTS

| | | | | |
|---|---|---|---|---|
| 9,105,041 | B2* | 8/2015 | Harman | G06Q 30/0269 |
| 10,366,434 | B1* | 7/2019 | Belousova | G06Q 30/0627 |
| 2003/0171944 | A1* | 9/2003 | Fine | G16H 20/60 |
| | | | | 705/2 |
| 2008/0147611 | A1* | 6/2008 | Bennett | G06Q 30/00 |
| 2009/0234712 | A1* | 9/2009 | Kolawa | G06Q 30/02 |
| | | | | 705/14.4 |
| 2009/0254541 | A1* | 10/2009 | Kolawa | G06Q 10/063 |
| 2011/0208617 | A1* | 8/2011 | Weiland | G06Q 30/0641 |
| | | | | 705/27.1 |
| 2011/0313867 | A9* | 12/2011 | Silver | G06Q 10/02 |
| | | | | 705/15 |
| 2012/0072302 | A1* | 3/2012 | Chen | G06Q 30/0631 |
| | | | | 705/26.7 |
| 2012/0166267 | A1* | 6/2012 | Beatty | G06Q 30/0219 |
| | | | | 705/14.21 |
| 2013/0144730 | A1* | 6/2013 | Harman | G06Q 30/0633 |
| | | | | 705/15 |
| 2013/0224694 | A1* | 8/2013 | Moore | G16H 20/60 |
| | | | | 434/127 |
| 2015/0006303 | A1* | 1/2015 | Little | G06Q 30/0282 |
| | | | | 705/15 |
| 2015/0073925 | A1* | 3/2015 | Renfroe | G06Q 50/12 |
| | | | | 705/15 |
| 2015/0132725 | A1* | 5/2015 | Okubo | G09B 19/0092 |
| | | | | 434/127 |
| 2015/0142649 | A1* | 5/2015 | Rathod | G06F 16/275 |
| | | | | 705/40 |
| 2015/0220624 | A1* | 8/2015 | Bhatt | G06F 16/951 |
| | | | | 707/722 |
| 2015/0371164 | A1* | 12/2015 | Ratakonda | A23L 3/34095 |
| | | | | 705/7.36 |
| 2016/0350834 | A1* | 12/2016 | Wilson | G06N 3/084 |
| 2017/0169495 | A1* | 6/2017 | Rathus | G06Q 30/0625 |
| 2017/0323174 | A1* | 11/2017 | Joshi | G06K 9/344 |
| 2017/0372197 | A1* | 12/2017 | Baughman | A23L 33/30 |
| 2018/0157664 | A1* | 6/2018 | Howell | G06N 20/10 |
| 2018/0189636 | A1* | 7/2018 | Chapela | A61B 5/681 |
| 2018/0285946 | A1* | 10/2018 | Figueredo | G06Q 30/0282 |
| 2018/0293489 | A1* | 10/2018 | Eyster | G06Q 30/0631 |
| 2018/0308143 | A1* | 10/2018 | Chan | G06Q 30/0643 |
| 2018/0336603 | A1* | 11/2018 | Jhuo | G06Q 30/0282 |
| 2019/0043143 | A1* | 2/2019 | Camacho | G06Q 30/0633 |
| 2019/0228856 | A1* | 7/2019 | Leifer | G16H 20/60 |
| 2019/0290172 | A1* | 9/2019 | Hadad | A61B 5/0022 |
| 2019/0295124 | A1* | 9/2019 | Ramesh | G06N 3/08 |
| 2019/0295440 | A1* | 9/2019 | Hadad | G06F 40/216 |
| 2020/0042816 | A1* | 2/2020 | Gatto | G06K 9/00201 |
| 2020/0098466 | A1* | 3/2020 | Murdoch | H04W 4/021 |
| 2020/0234045 | A1* | 7/2020 | Palomo | G06F 16/5846 |
| 2020/0302377 | A1* | 9/2020 | Danducci | G06Q 10/087 |
| 2020/0342550 | A1* | 10/2020 | Halimsaputera | G06N 20/00 |
| 2021/0004891 | A1* | 1/2021 | Abutair | G16H 50/20 |
| 2021/0019800 | A1* | 1/2021 | Chan | G06Q 30/06 |
| 2021/0264493 | A1* | 8/2021 | Haghighat Kashani | G06Q 30/0201 |

FOREIGN PATENT DOCUMENTS

| | | | | |
|---|---|---|---|---|
| CN | 111522848 A | * | 4/2020 | G06F 16/2455 |
| EP | 1301877 A2 | * | 12/2000 | G06F 17/60 |
| WO | WO 2018/109761 A1 | * | 12/2017 | G06Q 30/0601 |
| WO | WO 2021/037562 A1 | * | 8/2020 | G06Q 30/0631 |

OTHER PUBLICATIONS

Personalized Food Recommendation Using Deep Neural Network, Mokdara et al., 2018 Seventh ICT International Student Project Conference (ICT-ISPC).*

Being a Supercook: Joint Food Attributes and Multimodal Content Modeling for Recipe Retrieval and Exploration, Weiqing Min et al., IEEE Transactions on Multimedia, vol. 19, No. 5, May 2017.*

* cited by examiner

SYSTEM ARCHITECTURE

ADMINISTRATION APPLICATION

RATING SYSTEM

RESTAURANT APPLICATION

USER APPLICATION

USER DASHBOARD
(DESKTOP CLIENT)

DISH SEARCH LISTING
(DESKTOP CLIENT)

RESTAURANT SEARCH LISTING
(DESKTOP CLIENT)

ORDER HISTORY
(DESKTOP CLIENT)

RATING AND REVIEW
(DESKTOP CLIENT)

DISH REVIEW
(DESKTOP CLIENT)

USER DASHBOARD
(MOBILE CLIENT)

DISH SEARCH LISTING
(MOBILE CLIENT)

RESTAURANT SEARCH LISTING
(MOBILE CLIENT)

ORDER HISTORY
(MOBILE CLIENT)

RATING AND REVIEW
(MOBILE CLIENT)

DISH REVIEW
(MOBILE CLIENT)

METHODS AND APPARATUS FOR A DISH RATING AND MANAGEMENT SYSTEM

CROSS-REFERENCE TO RELATED APPLICATIONS

This application claims the benefit under 35 U.S.C. § 119 of U.S. Provisional Application Ser. No. 62/720,146, filed on Aug. 21, 2018, and entitled "Methods And Apparatus For Dish Selection," which is incorporated herein by reference in its entirety.

TECHNICAL FIELD

The described embodiments relate generally to rating systems, and more particularly to food rating and selection systems.

BACKGROUND INFORMATION

Consumers now have a wide choice of restaurants from which to choose. Typically, consumers get recommendations from family or friends about restaurants that offer top quality foods and service. Another way consumers get recommendations is through online review services. For example, after people dine at a restaurant they have the option to post a review online describing their overall experiences. However, these reviews typically represent an overall dining experience resulting in a "thumbs-up" or "thumbs-down" result. Thus, there may be a wide range of experiences that are posted. This makes it difficult for consumers to select a restaurant that is more likely to provide a particular type of food or dish at a desired level of quality.

With so many restaurants to choose from, it may be difficult for consumers to find a particular type of food or dish. For example, different restaurants may have different names for the same dish. The names chosen by restaurants may or may not identify the ingredients in the dish. For example, a restaurant may name a dish "Today's Special" and the dish may include virtually any ingredients, such as chicken, beef, eggs, or vegetables. Unfortunately, conventional selection systems generally do not account for the wide variety of names that may be used for the same dish, which makes it difficult for consumers to find a particular type of dish.

Therefore, it would be desirable to have a mechanism that facilitates the selection and rating of individual dishes at restaurants so that consumers are more likely to obtain a particular type of food or dish at a desired level of quality.

SUMMARY

In various exemplary embodiments, a dish rating and management (DRM) system is provided that facilitates the rating and selection of individual dishes at restaurants so that consumers are more likely to obtain a particular type of food or dish at a desired level of quality.

In one embodiment, the DRM system stores dishes provided by multiple restaurants and stores ratings for each dish. The system maintains a database of dishes and ratings. A user is presented with dishes and associated ratings based on one or more selection criteria. The selection criteria include at least one of dish names, dish ingredients, dish ratings, dish popularity information, user location and region information, types of cuisine, and dietary restrictions of the user. Once the user selects and orders a dish, the system processes the order for the selected dish. The system causes the order to be placed with a food provider that provides the selected dish. The order is either for the user to dine-in at a location of the food provider, an order for pick-up, or an order for delivery to the user. After the user has received the ordered dish, the system queries the user for a numeric rating of the dish. The query identifies dishes to be rated from the user's order thus allowing the user to rate only the dishes that were ordered, thereby forming a closed loop around an order, receipt, and rating of dishes. The database is updated with the new dish rating and the system provides a reward to the user for rating the dish. In one example, the reward is monetary in the form of cash, credit, or gift cards.

In one embodiment, the DRM system performs cross-reference dish discovery functions, which means that the system has the ability to decode proprietary fancy dish names given by restaurants to generically known names. The introduction of generically known names into the system establishes a relationship between branded names and generic names to facilitate the discovery of available dishes by the consumer.

In another embodiment, an apparatus is provided that comprises a memory that maintains a database of dishes and their numeric ratings, and a user interface that provides communications with a user. The apparatus also comprises a processing circuit coupled to the memory and the user interface. The processing circuit controls the memory and the user interface to receive selection criteria from a user, identify selected dishes from the memory based on the selection criteria, present the selected dishes and their numeric ratings to the user, process an order from the user for at least one dish, query the user for a new numeric dish rating for the at least one dish, and update the database with the new numeric dish rating.

In accordance with one novel aspect, the DRM system recommends the highest rated dishes available in a particular locality. The recommendation is provided by a rating system with the ratings coming from customers that frequent restaurants for dine-in, pick-up, and delivery food orders. The system also gives consumers rewards for the ratings they provide to the system. In one example, the rewards are provided in the form of financial credit usable by the consumers in their future purchases and orders. In another example, the rewards are cashback amounts that are deposited into financial accounts of their choosing. In yet another example, the rewards are provided in the form of gift cards, debit cards with cash balances, or coupons that are provided to consumers.

Consumers have many choices of restaurants, however, they often cannot easily find the restaurant that is top rated for their favorite dish. Some restaurants excel in certain dishes but not all. Most of the ratings available today are overall restaurant reviews that do not provide specific rating information about individual dishes. Thus, consumers do not have an option to rate their favorite dish or determine where that dish is served best in their locality. In various exemplary embodiments, the DRM system, comprising methods and apparatus disclosed herein, bridges this gap to help consumers find the highest rated dishes in a particular locality.

The DRM system provides users a way to identify and locate their favorite food or dish in a specific location. The DRM system also provides a key feature for ordering food, where orders received by the DRM system are sent directly to the restaurant without the user having to interact with that restaurant. A portion of the payment from the user (e.g., a commission that is either fixed or variable) is provided to the DRM system's account and another portion of the payment is provided to the restaurant's financial account. The system shares part of its commission with the user (in the form of a reward) when the user provides a numeric rating for the dish ordered. No user input is involved in transferring funds to the restaurant or in placing the order with the restaurant. The order is placed and paid for entirely through the DRM system. For example, the user need not visit the restaurant's website or contact the restaurant to place an order. A key win-win situation provided by the system involves three parties, namely; the company, restaurants, and users. The company is the entity that manages the DRM system, manages the DRM system food database, causes payments to be made to the restaurants, queries consumers for numeric dish ratings, and manages dish ratings that are received. The restaurants include low to high-end dine-in restaurants, food trucks, Quick Service Restaurants (QSRs), and any other institutions that are primarily concerned with providing food to consumers. Each of the entities mentioned above benefits from the DRM system as will be understood from the description below.

In various exemplary embodiments, the company partners up with restaurants by offering the following two propositions to the restaurants. First, the DRM system brings in more business to the restaurants. Second, the DRM system provides to restaurants numeric ratings for their dishes and additional restaurant parameters. In an embodiment, the DRM system will take a commission (for example, 20%) from the restaurant for every order placed through the DRM system or by a customer going to the restaurant to dine-in after seeing dish recommendations provided by the DRM system. The commission received by the DRM system can be fixed or variable depending on the day of the week, volume or orders, or any other criteria. Thus, both the restaurant and company benefit. Once the user has received the food that was ordered, the user will have the ability to provide to the DRM system numeric ratings for dishes of that specific order. The user will also be able to provide more general reviews if desired. After rating the dishes, the DRM system will reward the user with cash (for ratings) and/or points (for reviews) that can be used in future orders with any restaurant registered with the system. This will motivate users to rate and order via this system.

Thus, the DRM system provides, in effect, a "closed-loop" system that is not currently available today and in which a user can search for a favorite dish, receive a search result of the dish as offered from multiple food providers, with each provider's dish having a numeric rating. The user then selects and orders a highly rated dish from a particular provider based on the search result. After receiving the dish, the user is queried to provide a numeric rating of the dish to receive an award. As a result, the DRM system constantly updates the dish ratings with new user input, so that any changes in dish quality are reflected in the dish ratings. This assures users that the dishes they order will have a desired level of quality as indicated by the rating. Also, the users are queried to rate dishes to receive a reward. This encourages users to rate dishes they might not ordinarily rate.

The foregoing is a summary and thus contains, by necessity, simplifications, generalizations and omissions of detail; consequently it is appreciated that the summary is illustrative only. Still other methods, and structures and details are set forth in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
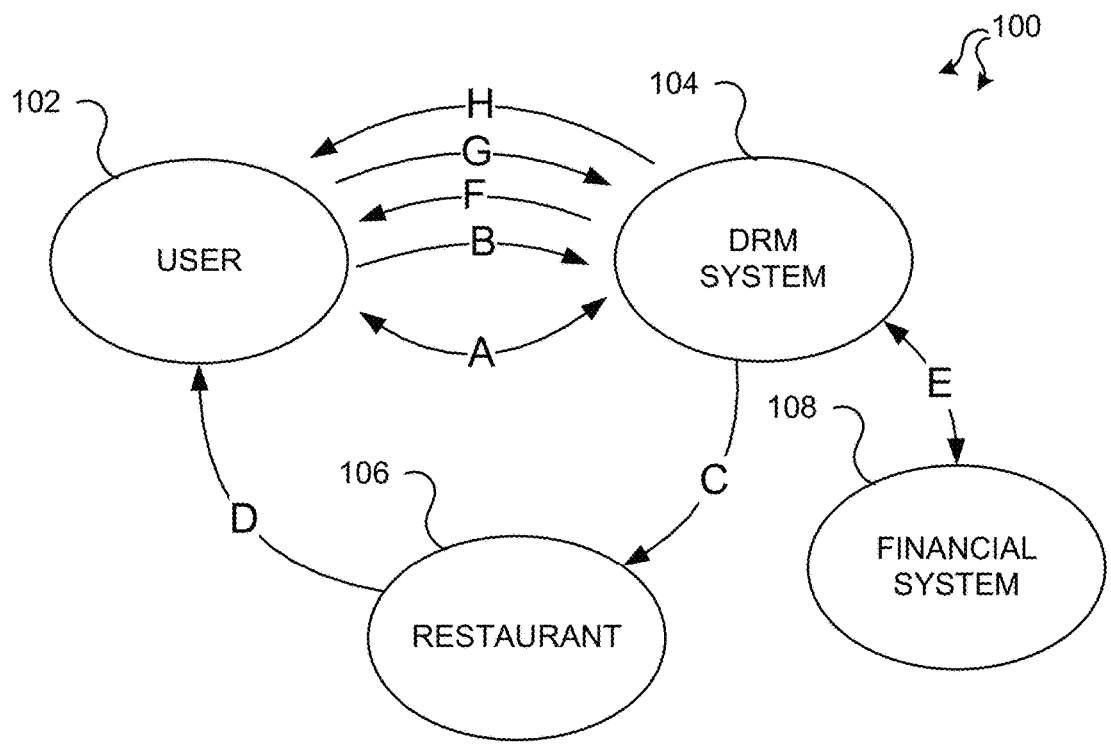
FIG. 1 is a diagram that shows an exemplary embodiment of a diagram that illustrates the operation of one embodiment of a dish rating and management system.

FIG. 1 shows an exemplary embodiment of a diagram 100 that illustrates the operation of one embodiment of a dish rating and selection system. The diagram 100 illustrates the "closed-loop" operation of the DRM system. The diagram 100 comprises a user 102, the DRM system 104, a restaurant 106, and financial system 108. In this embodiment, the user 102 represents a consumer or "diner" that desires to use the DRM system 104 to purchase food or food items ("dishes") for consumption. A dish comprises one or more individual food items (e.g., "a la carte") or a combination of food items (e.g., "plate"). For example, a dish is a consumable food (having selected ingredients) prepared in a certain way and available in a restaurant.

When using the DRM system 104, the user 102 communicates with the system 104 to search for available dishes along with a numeric user rating for each dish (indicated at A). The user 102 may search for specific types of dishes based on one or more search criteria. For example, the search criteria include but are not limited to dish type, dish rating, dish ingredients, geographic location of the restaurant offering the dish, and various other search criteria.

After viewing the available dishes and their associated numeric ratings, the user 102 indicates to the system 104, a selection of one or more dishes for purchase from a restaurant (indicated at B). The user 102 also pays for the dish or dishes ordered with an acceptable form a payment. For example, the acceptable forms of payment include but are not limited to debit card, credit card, electronic check, PayPal, Venmo, Apple Pay, Google Pay, cryptocurrency, reward points, or other forms of payment.

After receiving the user's selection, the system 104 confirms the payment and submits the payment to the financial system 108 (indicated at E). The DRM system 104 then sends a purchase request to the restaurant 106 to purchase the dish or dishes selected by the user 102 (indicated at C). The purchase request identifies the dish or dishes the user wants to order. In an embodiment, the purchase request (C) includes a form of payment to the restaurant. The restaurant 106 prepares the dish or dishes in the purchase request and delivers the prepared dishes to the user 102 (indicated at D).

After a dish is delivered to the user 102, the system 104 sends a query to the user requesting the user 102 to rate the dish (indicated at F). The user 102 responds by following procedures provided by the DRM system 104 to provide a numeric rating for the dish or dishes (indicated at G). It should be noted that the user may order the same dish multiple times and provide a separate rating each time the dish is ordered. Thus, the dish may be associated with multiple ratings provided by the same user.

After the user 102 provides a rating for the dish, the DRM system 104 issues a reward to the user (indicated at H) for providing the dish rating. In an embodiment, the rewards are stored in the DRM system 104 and the user can use the awards to purchase additional items in the future. A more detailed description of the DRM system 104 is provided below.

Figure 2:
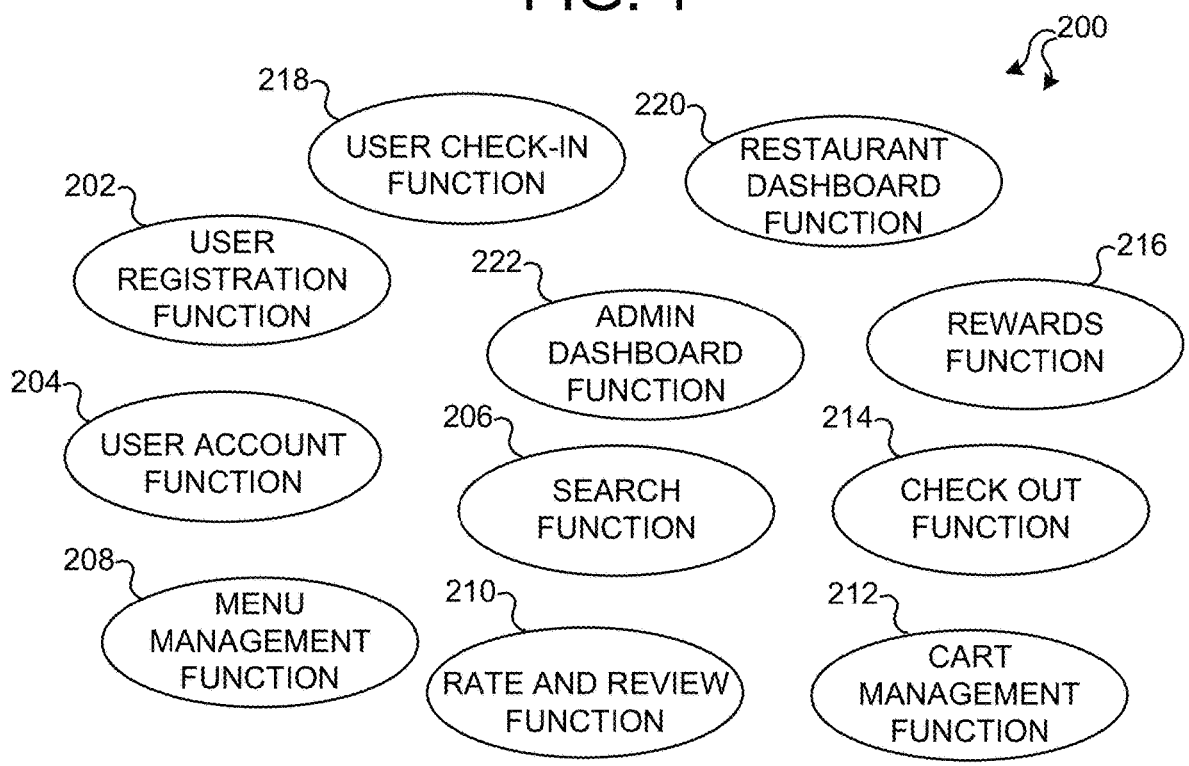
FIG. 2 is a diagram that shows functions provided by exemplary embodiments of the DRM system.

FIG. 2 shows functions 200 provided by exemplary embodiments of the DRM system. The following identifies potential users of the system.

Visitor—A casual visitor is a non-registered user who just browses the system to check ratings of dishes or restaurants.

Registered User—A registered user can rate and review a dish or a restaurant. The user can also buy food from restaurants and obtain discounts on the order after rating the ordered dishes. A user can perform all activities of a visitor.

Restaurant Manager—A Restaurant Manager will manage orders received through a Restaurant Manager application and can view order histories and process the orders which are sent by the system to a point of sale (POS) application that the DRM system provides. The orders can be sent to restaurants by email as well.

Restaurant Administrator—A Restaurant Administrator is typically a restaurant owner who can do all that a restaurant manager can do plus has access to a Restaurant Dashboard that displays various operational and dish metrics, like payments, receivables, dish ratings, metrics on dine-ins vs pick-ups etc.

System Administrator—The System Administrator has complete control over the operation of the DRM system.

Referring again to FIG. 2, the user registration function 202 allows a user to register with the system using an email address, Facebook, Instagram, Twitter, or other social media or network applications.

The user account function 204 maintains all the information about each user, such as the user's profile, total restaurant visits, restaurant orders, favorite dishes, favorite restaurants, and the user's incentives/rewards. The user will also be able to update the user profile information like email address, profile picture, payment options, password and the like.

The search function 206 allows a user/visitor to search for any dish by entering the name of the dish or selected keywords. In an embodiment, the user enters search parameters using a keypad or other input device. In another embodiment, the user enters search parameters using voice input. Any or all of the user inputs to the DRM system 104 can be provided by voice input.

The search will pull up the results that match the name or keywords. The results will display the searched dish item with ratings, restaurant and its address, and provides an "add to cart" icon. The dishes are stored in a database, not just based on the name that's available at a specific restaurant, but the data on a dish will also have 3 or more generic names that prevail in the market. For example, "generic dish names" means commonly used or well-known names understood by consumers for identifying particular types of dishes. For example, a "BIG BORDURRITO" is a steak or chicken burrito wrapped up in a seared flour tortilla with Mexican rice. A BIG BORDURRITO may also be called by the generic names "Chicken Burrito" or "Steak Burrito" in other restaurants. When a user searches for BIG BORDURRITO, both the "Chicken Burrito" and "Steak Burrito" will be fetched by the search engine and presented to the user. It is understood that this is merely one example provided for explanatory purposes. There will be instances where a restaurant can name a common item very differently to attract food lovers. The search engine finds all dishes having generic and specific restaurant based names and will display that information for the user. This is achieved by providing a DRM system feature that adds multiple names to a specific dish covering most of its prevailing and commonly used names. This will involve a complete study of the restaurants and their menus to understand the dishes on a deeper level to associate all appropriate names with a particular dish, rather than merely listing a menu item as named by a particular restaurant.

The menu management function 208 uses the menu of the restaurants as its source. There are multiple menu providers and many of them are not comprehensive. The system builds a menu database by working directly with the restaurants and/or using the services of menu providers. The idea is to focus on a specific location and then expand into other territories. A menu listing for a specific restaurant will have all its menu items with generic and other commonly used names, price, a clear description about the dish, cuisine type, and other information that describes menu items to the consumer.

The rate and review function 210 allows a registered user to provide a numeric rating for a specific dish that the registered user has ordered and to write comments about the dish in a form for reviews. Any type of numeric rating scale may be used to provide a way for a user to enter a rating for a dish. Each registered user can rate the dishes that they purchase. A user can only rate dishes that they have purchased.

The cart management function 212 allows a user to add menu items from the search screen or directly from the restaurant page. When a dish is selected from the search screen, it takes the user to its restaurant page as provided by the DRM system and the user is shown all the dishes of that restaurant with ratings. The user can add the preferred dishes to the cart to place an order.

The checkout function 214 can be used after a user chooses all the dishes and adds them to the cart. The user can now check out and place an order using a credit card or by applying the cash rewards that the user has accumulated by rating the dishes. The payment from the user is sent to the DRM system and not to the restaurant. In one embodiment, the payments to the restaurants are sent through a payment gateway system.

The rewards function 216 operates to reward the user with cash points/rewards every time the user rates a dish after an official order. The sequence for this starts with the user searching for a dish and placing an order from a restaurant. The payment will be processed by the DRM system so that the money is sent to the system's account and payment to the restaurant will be done through a payment gateway system. The order is sent to the restaurant via email or other means depending on how the restaurant is partnered with the system. The restaurant processes the order and has the food ready for the user to pick up. The user enjoys the food. The DRM system sends a reminder (notification) to the user to rate the dishes that were part of the order. The reminder is sent via email or through application notifications. Once the user rates the dishes, the user will get cash back rewards that can be applied to future orders.

The user check-in function 218 operates when the user goes to the restaurant to dine-in. If the user wants to dine-in at a specific restaurant, the user can check-in before going to the restaurant, which will alert the restaurant about the user's arrival. This feature is to facilitate the user to acquire the rewards by rating the dishes. After eating, the user can use the system to rate the dishes. The restaurant asks the user for his/her email identification (ID). In order to verify the identity, the restaurant will request a photo ID or a credit card. The restaurant uses the ID to obtain information to verify the user's identity. If there is a credit card on file, the restaurant will use the credit card to complete the checkout process. If there is no credit card on the file, the restaurant will use the customer's credit card and manually type in the credit card information. There will be an option to store the new credit card based on customer's consent. Once the check-out process is complete, if the user has an appropriate application on a mobile device (such as a smartphone), the application will pop-up the dishes the user ordered for the purpose of rating them. Once the user finishes rating, the user will see the corresponding credit in the user's account. In one example, the application is a mobile application that forms part of the DRM system 104 and is configured to communicate with a database of the DRM system 104.

The restaurant dashboard interface 220 operates to provide the restaurant the ability to manage the orders placed via the system. The restaurant manager is able to view all the active orders for both pick-up and dine-in categories. The restaurant manager can use the dashboard to get a comprehensive view on the orders and payments. The dashboard also allows the restaurant to upload the menu changes. An important aspect of the restaurant dashboard is providing the restaurant the ability to view analytics on the orders, top rated dishes, pending payments, and other useful information.

The administration dashboard 222 operates to allow a system administrator to perform administrative activities, like setting up a restaurant, adding or deleting a menu item of a restaurant, adding or deleting users, moderating ratings and reviews, managing application content, viewing orders, and viewing data regarding orders, users, and restaurants.

Figure 3:
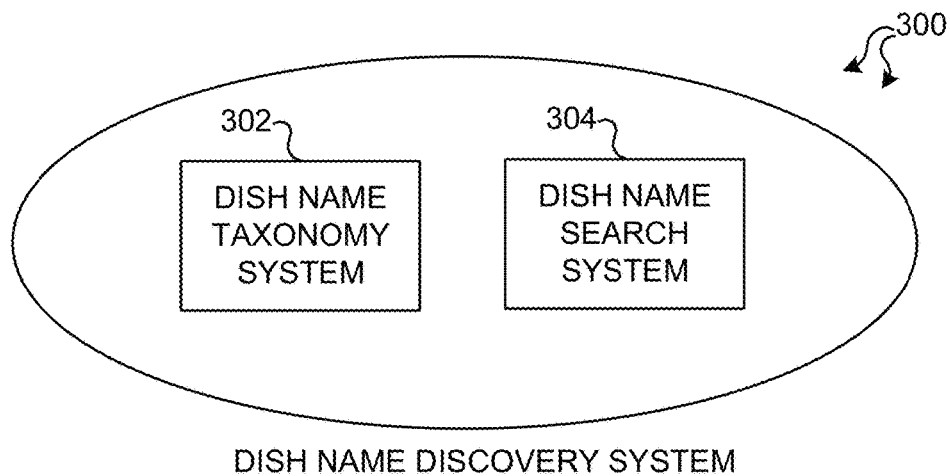
FIG. 3 is a diagram that shows an exemplary embodiment of a dish name discovery system.

FIG. 3 shows an exemplary embodiment of a dish name discovery system (DNDS) 300 that comprises a dish name taxonomy system (DNTS) 302 and a dish name search system (DNSS) 304. In an exemplary embodiment, the DNDS 300 is part of the menu management function 208 shown in FIG. 1.

The DNTS 302 operates to attribute multiple generic dish names to customized dish names provided by restaurants. For example, the generic dish names can be based on dish origin, ingredients and/or the original design of the dish. In an exemplary embodiment, the DNTS 302 performs manual curation and/or machine learning (ML)/Artificial Intelligence (AI) curation to generate generic dish names.

Figure 4A:
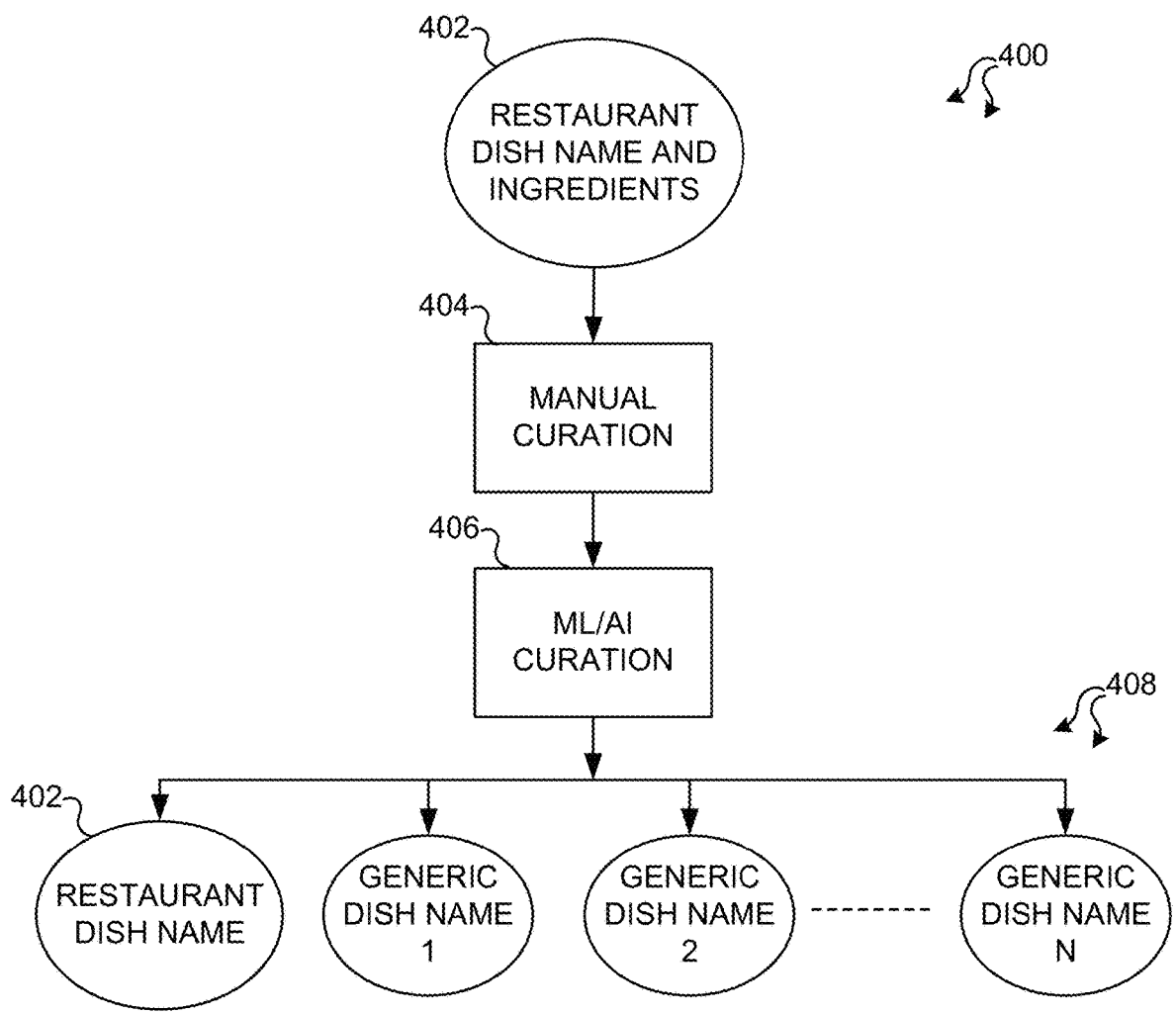
FIG. 4A is a diagram that illustrates exemplary operation of a dish name taxonomy system.

FIG. 4A shows a diagram 400 that illustrates exemplary operations of the DNTS 302 system. For example, at 402, a restaurant provides a dish name, ingredients list and/or other information associated with the dish to the DNTS 302. At 404, a manual curation process is performed where generic names for the dish are generated. For example, one or more of the generic names shown at 408 are manually generated. At 406, a machine language (ML)/Artificial Intelligence (AI) process is performed to generate additional generic names for the dish. For example, one or more of the generic names shown at 408 are generated by the ML/AI process at 406. Thus, when the operations of the DNTS 302 are complete, the original dish name and a plurality of generated generic names are stored for use during search operations.

Figure 4B:
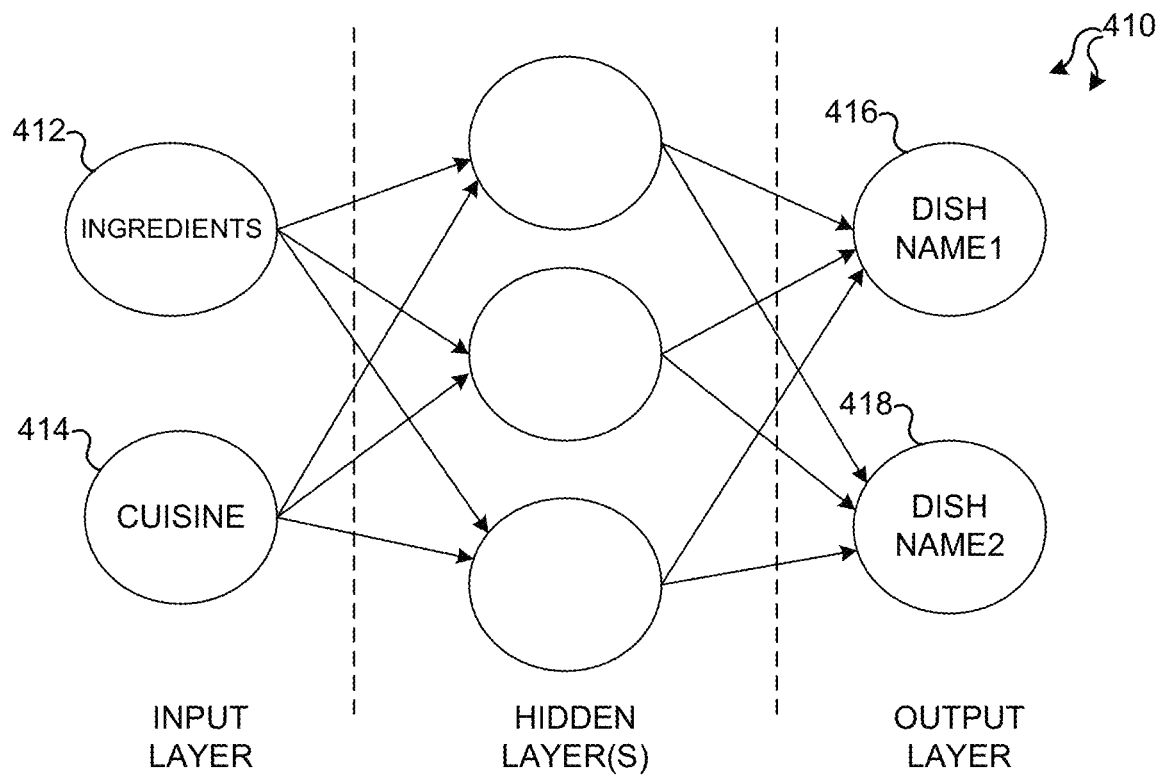
FIGS. 4B-C show exemplary AI networks used to provide dish name taxonomy.
Figure 4C:
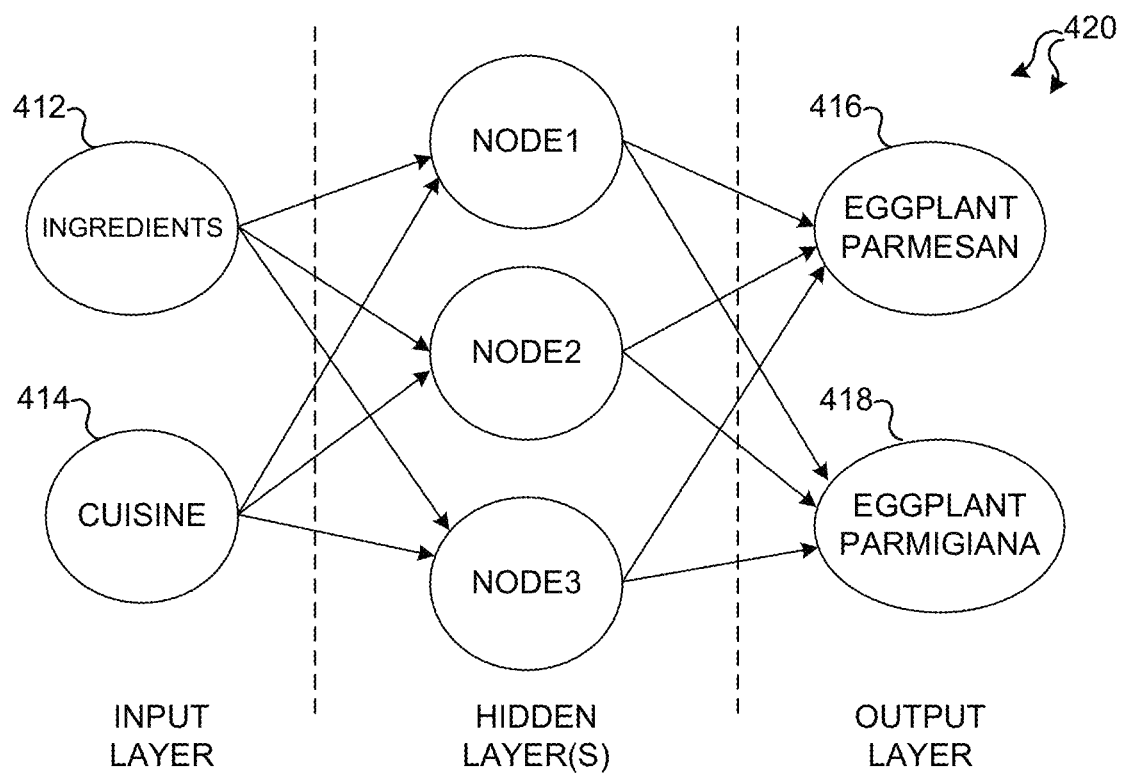

FIGS. 4B-C show exemplary AI networks for use at block 406 to generate generic dish names using a ML/AI process. Most of the dish names provided by restaurants around the world are arbitrary, proprietary and coined by restaurant owners and chefs of the restaurant to attract their customers. But it often leads to confusion with the potential customers not knowing exactly what each name means. This may hamper the discoverability of the dish and impacts the revenue of restaurants. A cross-reference system doesn't exist that decodes these proprietary names and helps neutralize them to more generically known names recognizable by the customers.

The AI networks shown in FIGS. 4B-C provide a solution to this problem. The AI networks shown in FIGS. 4B-C manage a database of all dishes, cuisine type and the ingredients that go into the making of a dish in a restaurant.

In an embodiment, a deep neural network 410 includes three or more layers with associated weights and biases. For example, the network 410 includes an input layer, one or more hidden layers, and an output layer. The network 410 accepts ingredients 412, cuisine 414 and other relevant inputs at the input layer. The hidden layers process the received inputs to generates dish names at the output layer. For example, given the inputs at the input layer, the network 410 generates and outputs dish names (NAME1 416 and NAME2 418) at the output layer.

As an example, an Italian restaurant has in their menu a dish called 'Melanzane Parmigiana'. From time to time, they may choose to change the name of the dish to attract customers, but the ingredients may not change. The AI network 410 will run the ingredients of this dish and will always come up with commonly known names, such as Eggplant Parmesan and Eggplant Parmigiana.

For example, the network 420 uses as inputs the ingredients 412, which may include eggplant, parmesan cheese, tomato sauce, herbs, salt, and other ingredients. These ingredients 412 and the cuisine type 414 (e.g., Italian) are input to the nodes (1-3) of the hidden layer. The appropriate weights are applied to the nodes of the input layer to determine the nodes (1-3) of the hidden layer. For example, the following exemplary weights may be used.

Node 1=(Ingredients*0.2+Cuisine*0.51)+0.09
Node 2+(Ingredients*0.32+Cuisine*0.15)+0.75
Node 3=(Ingredients*0.7+Cuisine*0.47)+0.62

The hidden nodes (1-3) are also weighted to generate names at the nodes of the output layer. In this case, the name generated at node 416 is "Eggplant Parmesan" and the name generated at node 418 is "Eggplant Parmigiana." Thus, the network 420 performs AI functions to generate generic dish names for use at block 406 as shown in FIG. 4A.

Referring again to FIG. 3, the DNSS 304 operates to return the original dish name when the user searches with a common name (generic) or widely used name or most popular names. For example, assuming the restaurant dish name is the "Tony Soprano Sandwich". The DNTS 302 curates this name to "Turkey Sandwich" and "Salami Sandwich". When a user searches for turkey sandwich, the DNSS 304 will search the database of dish names and return the "Tony Soprano Sandwich" as an available dish. In another embodiment, system will let the user search for a dish in a specific location. In this case, DNDS 300 will not only have the ability to find the best dish in the area but also identify a restaurant that serves a rare/favorite dish because of its ability to classify the restaurant dishes by multiple generic names that are easy to search.

In an embodiment, the system provides cross-reference dish discovery functions, which means that the system has the ability to decode proprietary fancy dish names given by restaurants to generically known names. Thus, cross-reference in this context means the ability to search for the same dish item that is named differently by different restaurants for branding reasons. For example, the system decodes branded dishes, such as "Joe's Sandwich", "Kim's double sandwich", etc., to a generic name, such as "Vegetarian Sandwich" that can be easily searched. Thus, when a consumer searches for 'Vegetarian Sandwich', the system will find and include "Joe's Sandwich" and "Kim's double sandwich" in the search results. As a result, the introduction of generic names into the system establishes a relationship between branded names and generic names to facilitate the discovery of available dishes by the consumer.

Figure 5:
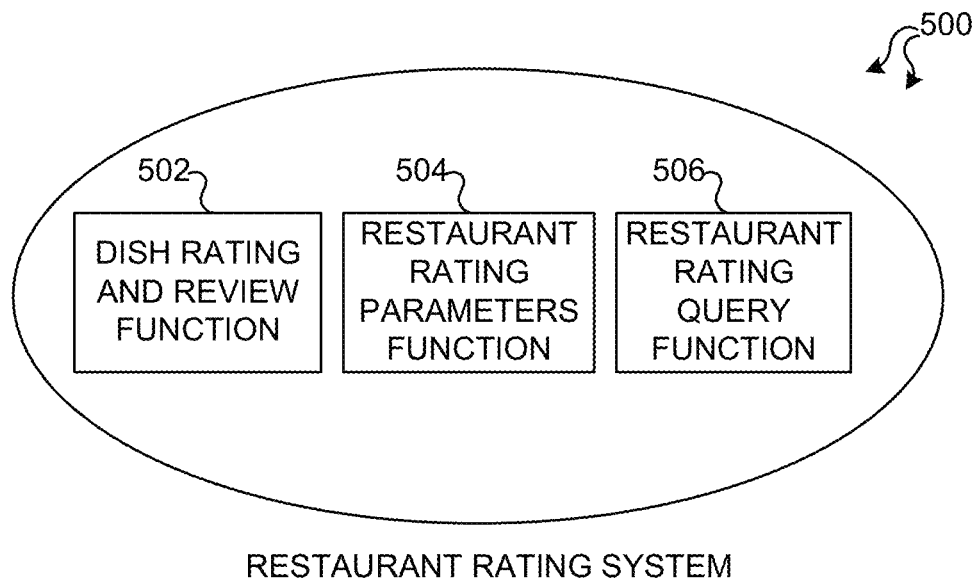
FIG. 5 is a diagram that shows an exemplary embodiment of a restaurant rating system.

FIG. 5 shows an exemplary embodiment of a restaurant rating system (RRS) 500. The RRS 500 comprises a dish rating and review function (DRRF) 502, restaurant rating parameters function (RRPF) 504 and restaurant rating query function (RRQF) 506.

In an exemplary embodiment, the numeric rating of a particular restaurant is calculated and aggregated based on the ratings of dishes, ambience, service etc. This feature will allow the user to search for a highly rated restaurant, and once a restaurant is chosen, the restaurant page provided by the DRM system will have all the items available from that restaurant listed with individual ratings. Ultimately, this provides the user with extensive information to make choices for both restaurants and dishes. Based on the ratings provided by consumers of the dishes of the restaurant, the rating of the restaurant is calculated by the DRM system.

In an exemplary embodiment, the DRRF 502 gathers a variety of rate-able parameters and aggregates these ratings to an overall rating.

In an exemplary embodiment, the RRPF 504 operates to manage the ratings and reviews of parameters such as ambience, service, catering service, and cleanliness.

In an exemplary embodiment, the RRQF 506 operates to provide query services that return a consolidated rating for the restaurant taking into consideration the individual ratings for the dishes and the ratings for the different parameters. The consolidated rating will be calculated using a weighted average for dishes, ambience, service, catering service and cleanliness. For example, a rating for a restaurant can be calculated using the following calculation set forth below.

Rating for restaurant=((0.5*[total ratings for the dishes/number of dishes])+(0.15*[total ratings for ambience/number of ratings])+(0.1*[total ratings for service/number of ratings])+(0.05*[total ratings for catering/number of ratings])+ (0.2*[total ratings for cleanliness/number of ratings]))

It is appreciated that the above rating calculation is but one example and other rating calculations may be employed. In addition, weight values are configurable and may change dynamically.

Figure 6:
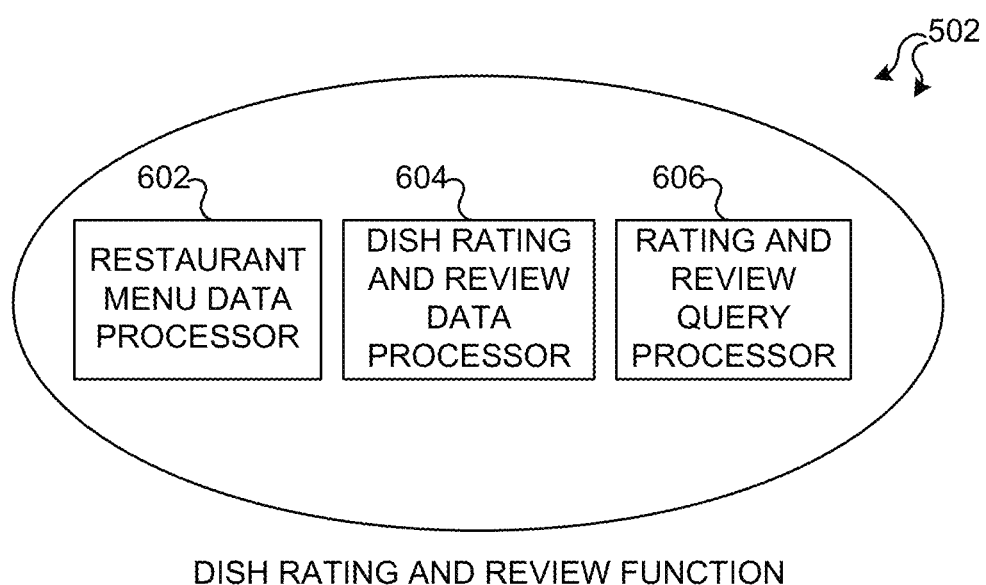
FIG. 6 shows an exemplary embodiment of a dish rating and review function shown in FIG. 5.

FIG. 6 shows an exemplary embodiment of the dish rating and review function 502 shown in FIG. 5. The DRRF 502 comprises a restaurant menu data processor (RMDP) 602 to manage restaurant menus, a dish rating and review data processor (DRRDP) 604 to manage ratings and review data, and a rating and review query processor (RRQP) 606 to query for ratings and reviews for dishes.

The DRRF 502 performs itemization of restaurant menu by categories and dishes. This allows the system to receive rating and reviews from the users at the dish level. Thus, rating and reviews are associated at the dish level and can be displayed to the users who are interested to know the specificity of the dish. The ability to rate a dish according to a user's satisfaction provides a very clear picture of the best items in a restaurant. The user will also be able to differentiate a specific dish in different restaurants with some authenticity without going only by a restaurant level rating.

In an exemplary embodiment, the responsibility of DRRF 502 is to associate ratings and reviews to a restaurant dish whose ratings and reviews are provided by the customers of the restaurant. These ratings and reviews can be queried providing a dish name or a unique dish identifier (ID).

In an exemplary embodiment, the RMDP 602 is responsible for managing restaurant menu data. The RMDP 602 provides facilities (e.g., database, admin tool) to curate menu data suitable for tagging ratings and reviews.

In an exemplary embodiment, the DRRDP 604 is responsible for managing user rating and reviews for dishes. The processor provides necessary database and services to receive and store user rating and reviews. The DRRDP 604 also provides a way to aggregate all users' ratings into a single digit rating. In one embodiment, the digit rating will be a simple average (sum of total ratings/number of users providing the ratings).

In an exemplary embodiment, the rating and review query processor 606 is responsible for providing rating and reviews for a given dish (e.g., bases on a unique dish ID). The system provides necessary services to query the three different subsystems described above to return ratings and reviews.

Figure 7:
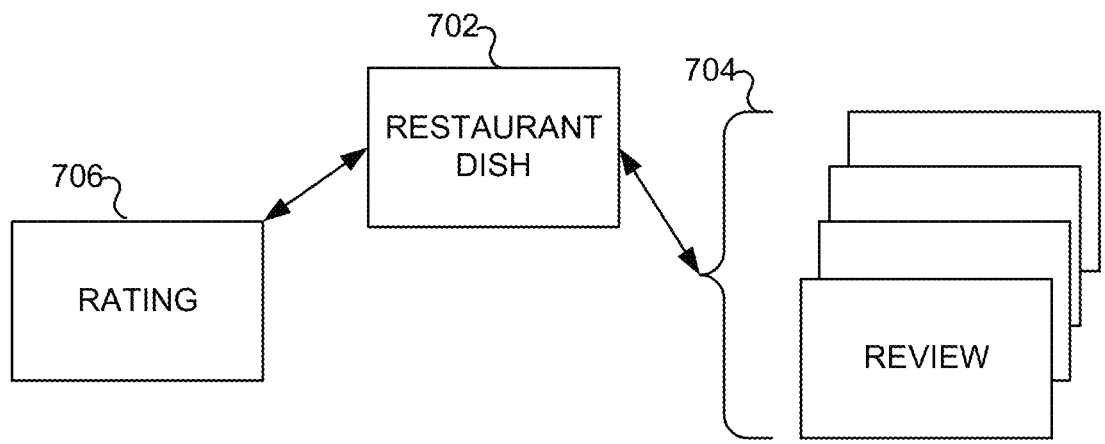
FIG. 7 is a diagram that shows the relationship between restaurant dishes, reviews, and dish ratings.

FIG. 7 shows a diagram that illustrates the relationship between restaurant dishes, reviews, and a dish rating. For example, a restaurant dish 702 may receive one or more reviews 704 that are combined to generate a rating 706. Thus, the DRRF 502 operates to manage restaurant menus, ratings, and review data, and provides a query system to query users for ratings and reviews for dishes.

Figure 8:
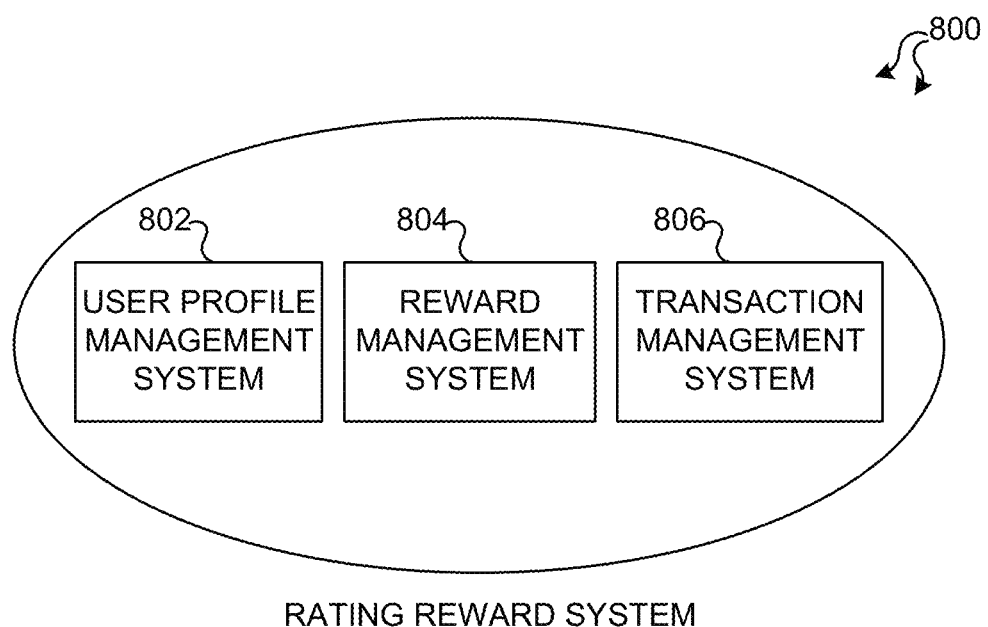
FIG. 8 is a diagram that shows an exemplary embodiment of a rating reward system.

FIG. 8 shows an exemplary embodiment of a rating reward system (RRS) 800. The RRS 800 comprises a user profile management system (UPMS) 802, reward management system (RMS) 804, and a transaction management system (TMS) 806.

In an exemplary embodiment, any registered user can rate and review the dishes. When any order is placed, the user will be given an opportunity to rate the ordered dishes within a specific time frame (for example, 3-7 days from the order date). A timer is triggered after the order is placed to ensure that the rating is received within the time frame. The timer is configurable by administrators of the system 104. Once the user rates the ordered dishes, the user will be given cash and/or point rewards that can be applied for future orders. The cash rewards feature is applicable to both pick-up and dine-in options.

In an exemplary embodiment, the UPMS 802 operates to manage user profile information. The RMS 804 operates to manage both cash rewards and point rewards. The cash rewards are credited to the user if they rate the dishes and other parameters of the restaurant. The point rewards are provided if they write reviews for dishes and other parameters. The TMS 806 operates to track the user actions, such as purchase of dishes in a restaurant, status of the order and receivables and payables.

Figure 9A:
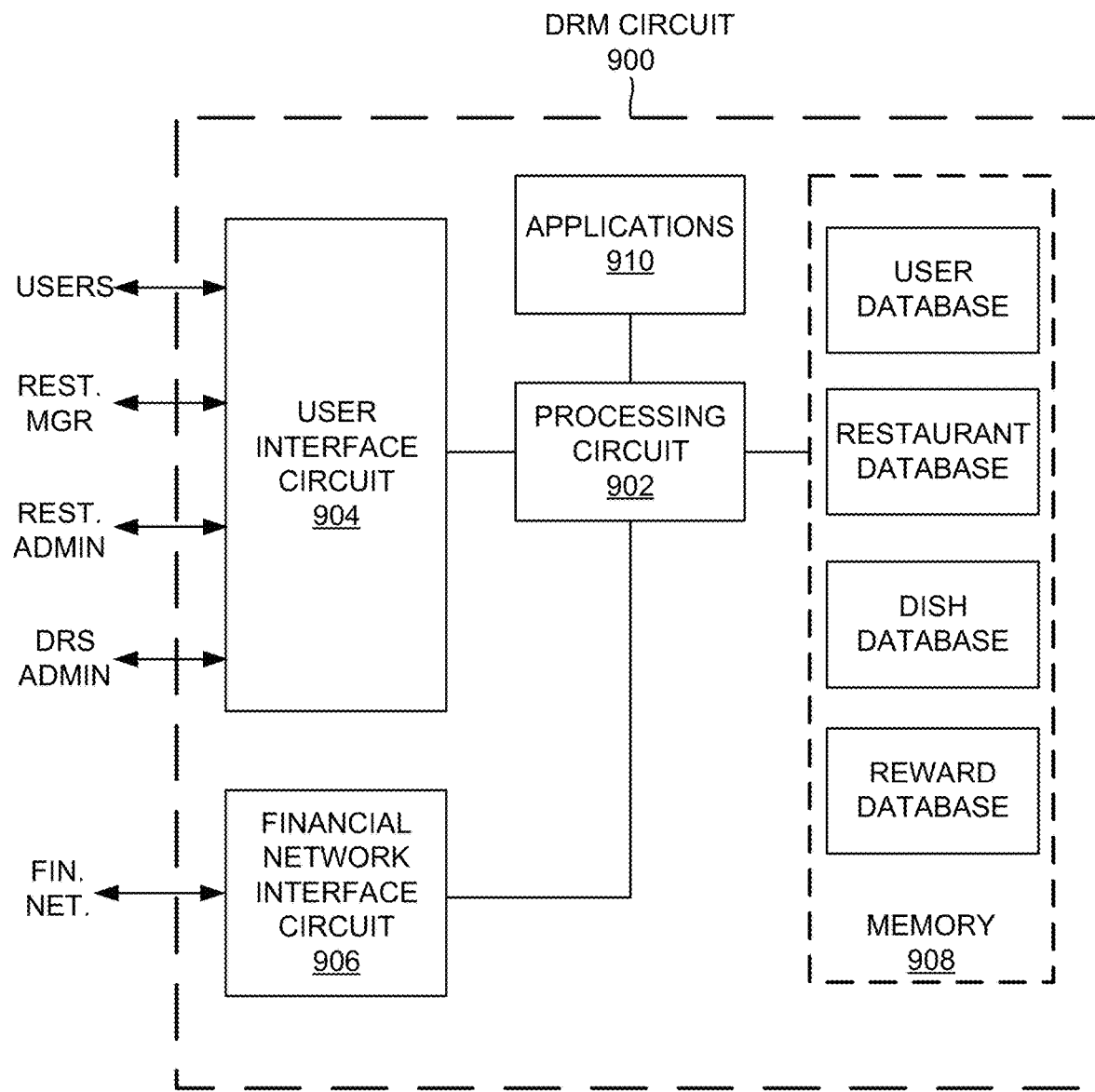
FIG. 9A is a diagram that shows an exemplary embodiment of a DRM circuit.

FIG. 9A shows an exemplary embodiment of a DRM circuit 900. The circuit 900 comprises a processing circuit 902, user interface circuit 904, financial network interface circuit 906, memory 908, and applications 910.

The user interface circuit 904 comprises any suitable interface technology to allow communications with various users of the system. The financial network interface circuit 906 comprises any suitable technology to allow communications with financials systems for the purpose of payment transactions. The processing circuit 902 executes the applications 910 to perform all the functions of the system as described herein. The memory 908 stores various databases, such as a user database, restaurant database, dish database, and reward database that are used to keep track of participating users, restaurants, dishes, and rewards, respectively.

FIGS. 9B-F show an exemplary embodiments of a DRM system.

Figure 9B:
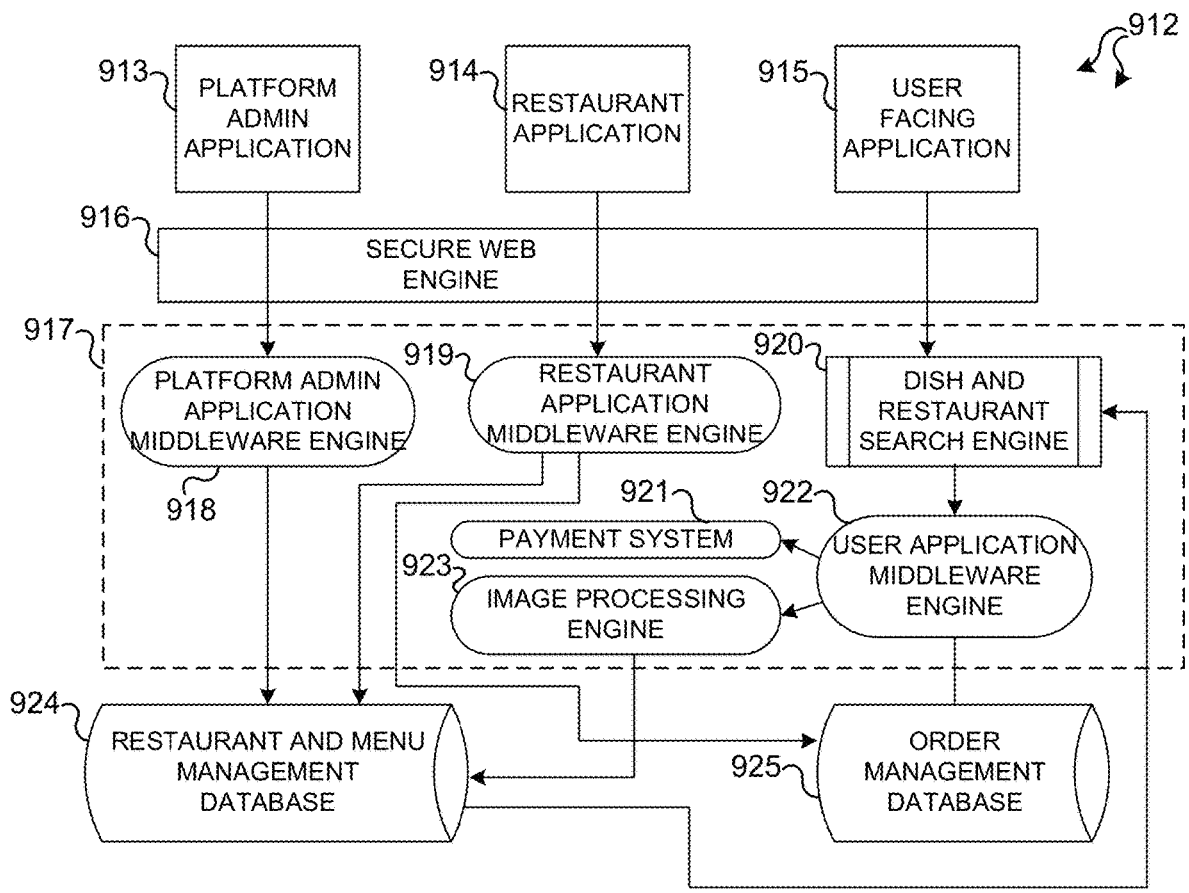
FIGS. 9B-F show an exemplary embodiments of a DRM system.

FIG. 9B shows an exemplary embodiment of a system architecture 912. The architecture 912 comprises platform administration application 913, restaurant application 914, user facing application 915, secure web engine 916, system platform 917, restaurant and menu management database 924, and order management database 925.

In an embodiment, the system platform 917 comprises platform administrator application middleware engine 918, restaurant application middleware engine 919, dish and restaurant search engine 920, payment system 921, user application middleware engine 922 and image processing engine 923.

Figure 9C:
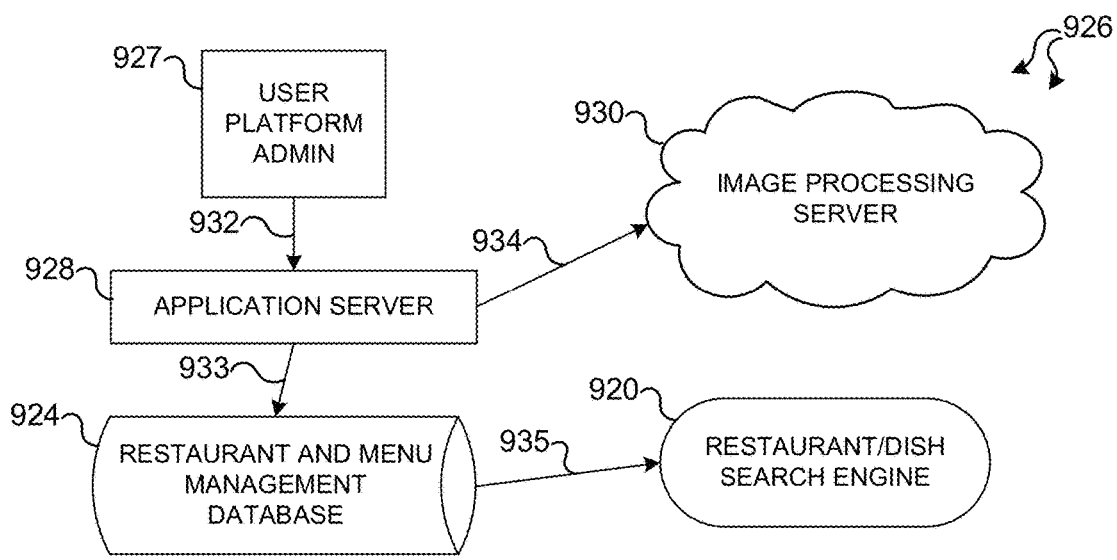

FIG. 9C shows an exemplary embodiment of a platform administration application 926. The application 926 comprises user platform administrator 927, application server 928, restaurant and menu management database 924, image processing server 930, and restaurant/dish search engine 920.

In an embodiment, the functions of the administration application 926 operate and communicate information as follows.

As indicated at 932, the user platform administrator 927 is the authorized user to access the user administration interface to create and update the restaurant information including the menu information.

As indicated at 933, the application server 928 creates the restaurant and menu objects and stores the information in database 924 as JSON structure.

As indicated at 934, the images of the restaurant and dishes are processed and stored into multiple renditions with appropriate index to server the user application.

As indicated at 935, the restaurant and menu/dish information is the pushed to the search engine and made available for the search.

Figure 9D:
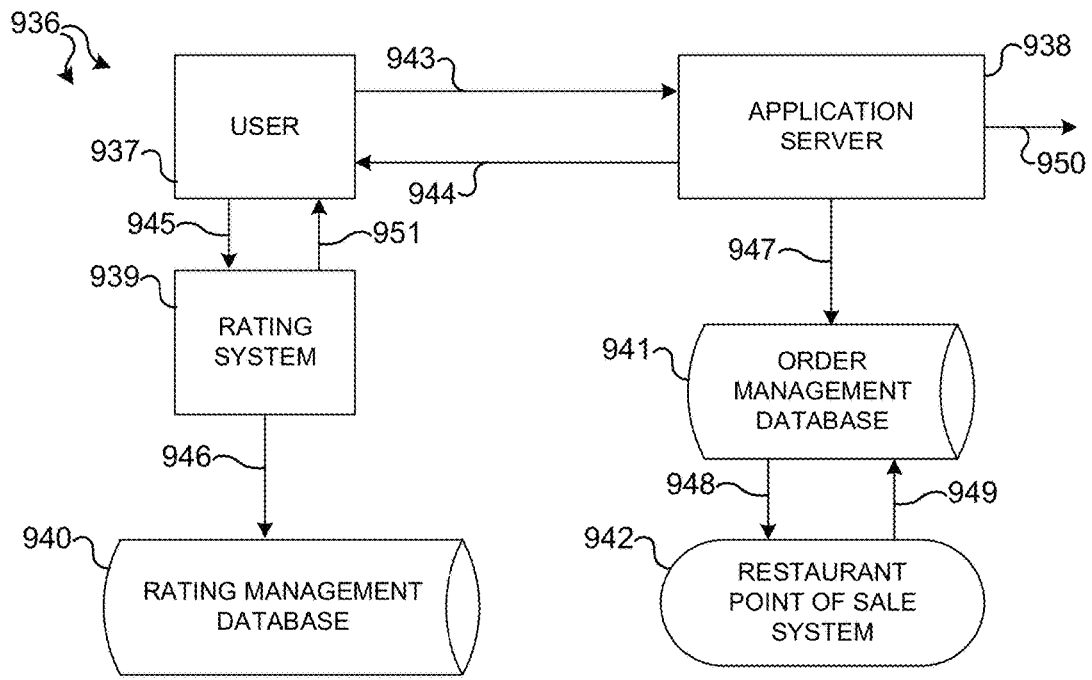

FIG. 9D shows an exemplary embodiment of a rating system 936. In an embodiment, the rating system 936 comprises user 937, application server 938, rating system 939, rating management database 940, order management database 941, and restaurant point of sale (POS) 942.

In an embodiment, the functions of the rating system 936 operate and communicate information as follows.

As indicated at 943, a user places an order from the application.

As indicated at 947, the order is entered into the order management system database.

As indicated at 948, the order is sent to the restaurant point of sale system.

As indicated at 949, the order is accepted.

As indicated at 950, the order is picked up or delivered.

As indicated at 944, the application notifies (or queries) the user to numerically rate the ordered dishes after the delivery/pick up of the order.

As indicated at 945, the user rates all the dishes of the order.

As indicated at 946, the ratings and reviews for the ordered dishes are persisted to the order management database which will be the repository for the ratings and reviews of all the dishes.

As indicated at 951, the user is provided with credits for rating the ordered dishes.

Figure 9E:
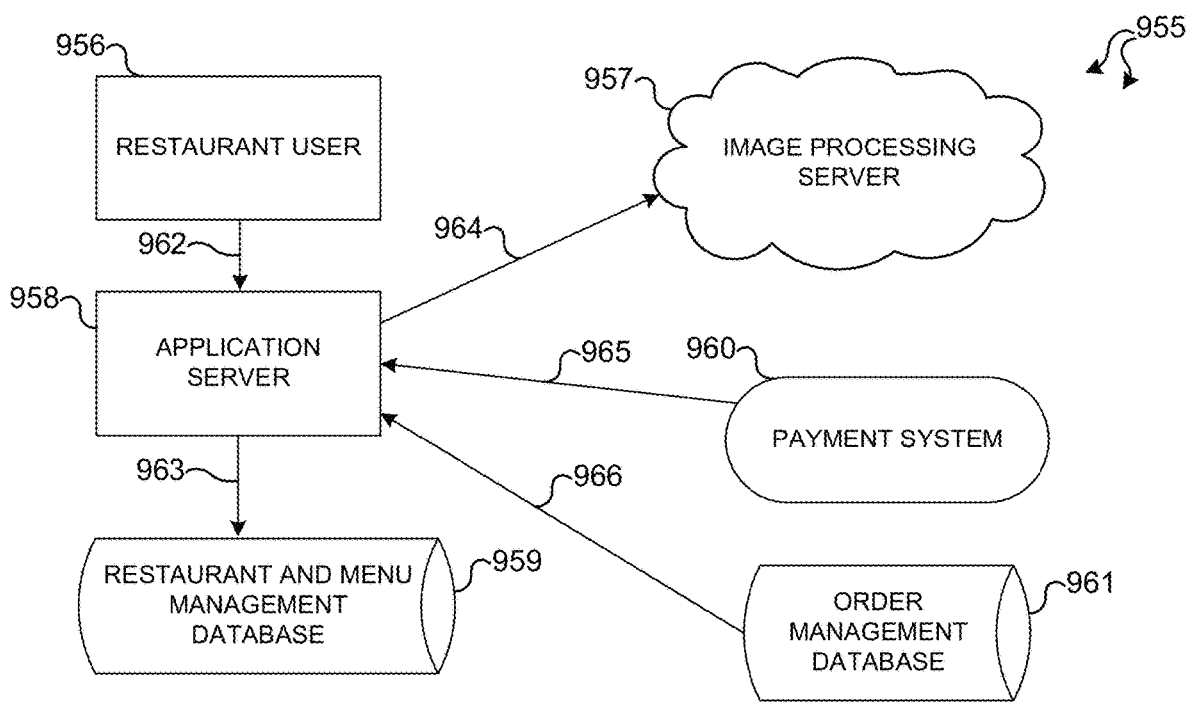

FIG. 9E shows an exemplary embodiment of a restaurant application 955. In an embodiment, the restaurant application 955 comprises restaurant user 956, image processing server 957, application server 958, restaurant and menu management database 959, payment system 960, and order management database 961.

In an embodiment, the functions of the restaurant application 955 operate and communicate information as follows.

As indicated at 962, the restaurant administration user is the authorized user to access the restaurant user interface to create and update the restaurant information including the menu information. The restaurant user will be able to accept and deny orders.

As indicated at 963, the application server creates the restaurant and menu objects and stores the information in databases as JSON structure.

As indicated at 964, the images of the restaurant and dishes are processed and stored into multiple renditions with appropriate index to serve the user application.

As indicated at 966, the restaurant user will be able to view orders and do order management including accepting and denying the orders.

As indicated at 965, the payment system is invoked and payment is made once the orders are accepted.

Figure 9F:
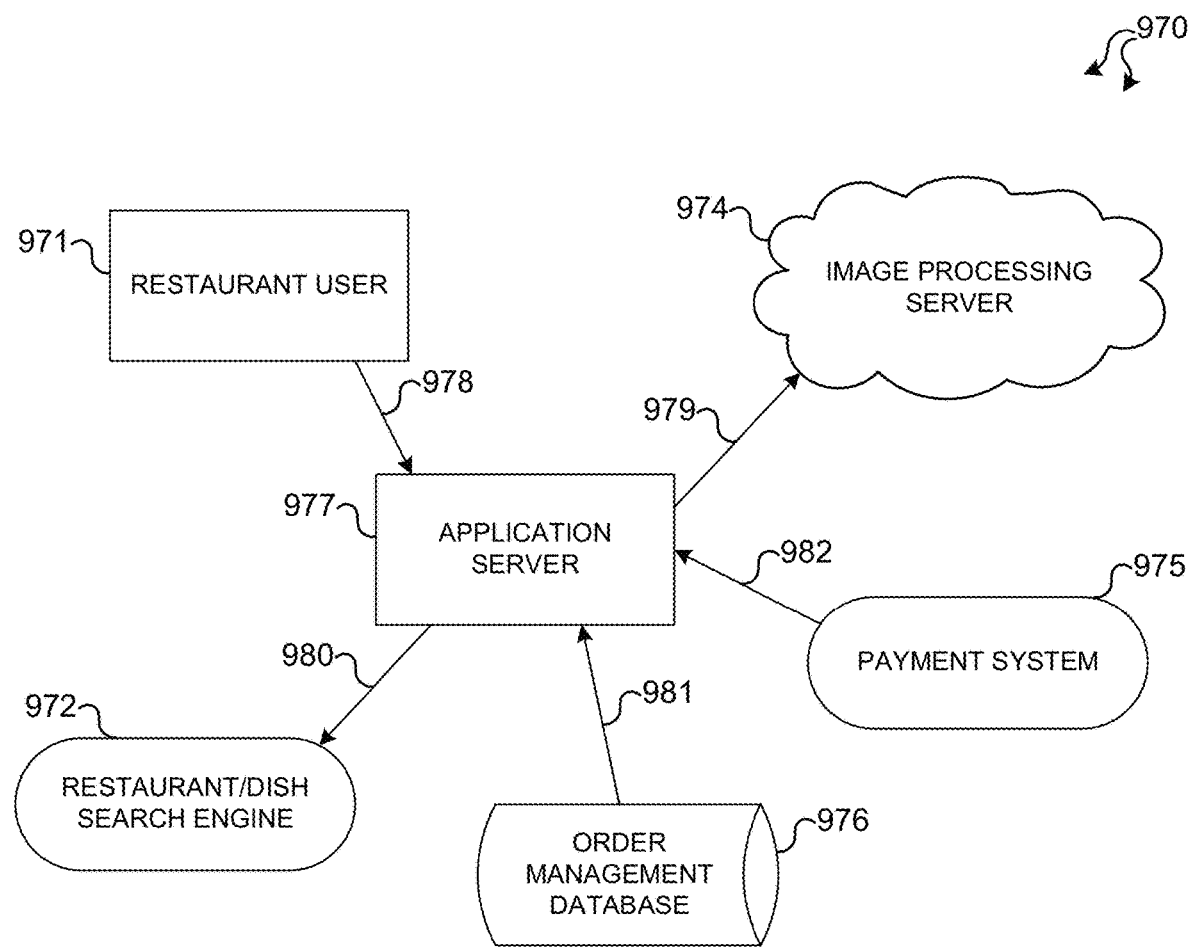

FIG. 9F shows an exemplary embodiment of a user application 970. In an embodiment, the user application 970 comprises restaurant user 971, restaurant/dish search engine 972, image processing server 974, payment system 975, order management database 976, and application server 977.

In an embodiment, the functions of the user application 970 operate and communicate information as follows.

As indicated at 978, the user will be able to register, login, search for dishes and restaurants, order, and rate the dishes on the platform.

As indicated at 980, the search engine is powered by AI where the dish names are normalized and provides recommendations based on the ingredients of the dish.

As indicated at 979, the images of appropriate renditions are retrieved from the server for respective screens.

As indicated at 982, when the order is placed, the user payment information will be authorized by the payment system. Multiple payment methods or information of the user is stored in the payment system.

At indicated at 981, all the user and the order related information is stored and managed in the order management database 976. The restaurant will be notified via listener that gets alerted if the order is placed.

Figure 10:
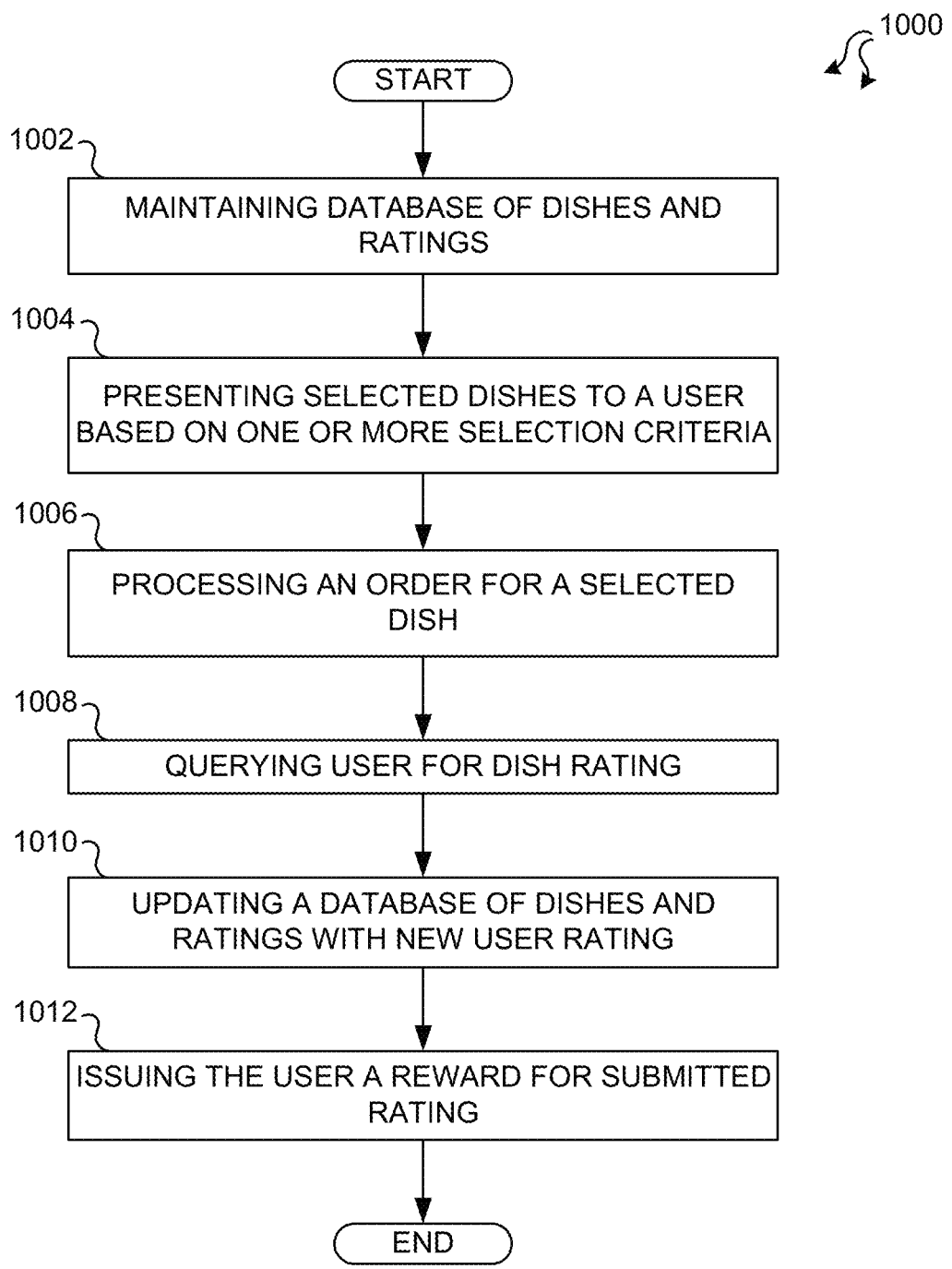
FIG. 10 is a flowchart that shows an exemplary embodiment of a method that allows a user to place a dish order, provide a rating, and receive a reward.

FIG. 10 shows an exemplary embodiment of a method 1000 performed by the DRM circuit 900 that allows a user to place a dish order, provide a rating, and receive a reward.

At block 1002, a database of dishes and ratings is maintained. For example, the processing circuit 902 maintains, in the memory 908, the dish database that identifies dishes and their associated ratings.

At block 1004, selected dishes are presented to a user based on one or more selection criteria, such as dish name, dish rating, geographic region, most popular dish, cuisine name, dietary restrictions, and proximity to the user. For example, a user interacts with the DRM circuit 900 through the user interface circuit 904 to input selection criteria to the processing circuit 902. The processing circuit 902 uses the received selection criteria to search the dish database in the memory 908 to determine dish suggestions that match the selection criteria. The circuit 902 then outputs the dish suggestions that match the selection criteria to the user through the user interface circuit 904.

At block 1006, the order for a selected dish is processed. For example, the user places the order with the DRM circuit 900 along with payment information, such as credit card information. The processing circuit 902 receives the order from the user through the user interface 904. The processing circuit 902 places the order with the associated restaurant by transmitting the order to the restaurant manager using the interface circuit 904. The processing circuit 902 also sends the payment information to a financial network using the financial network interface circuit 906. In an embodiment, the DRM system retains a percentage of the payment in its own account. For example, the commission may be a fix rate, such as 20%, or may be a variable rate based on day of the week, order volume, or any other criteria. The remainder of the payment is credited to the restaurant's account that is accessed through the financial network interface circuit 906. Upon receiving the order and confirmation of payment, the restaurant prepares and delivers the order to the user, or makes the order available for pick-up by the user.

At block 1008, the user is queried to enter a rating for the ordered dish. For example, the processing circuit 902 outputs a query to the user through the user interface 904. After receiving the query, the user provides a new rating for the dish to the processing circuit 902.

At block 1010, the received new rating is used to update the maintained databases of dishes and ratings. For example, the processing circuit 902 updates the dish database in the memory 908 with the new rating information.

At block 1012, the user is issued a reward for rating the dish. For example, the processing circuit 902 issues a reward to the user for the new rating. The reward may be entered and maintained in the reward database in the memory 908. The user database in the memory 908 may also be updated to reflect that the user has one or more rewards.

It should be noted that the method 1000 is exemplary and that changes, additions, rearrangements, deletions, and/or modifications of the operations are within the scope of the exemplary embodiments.

Figure 11:
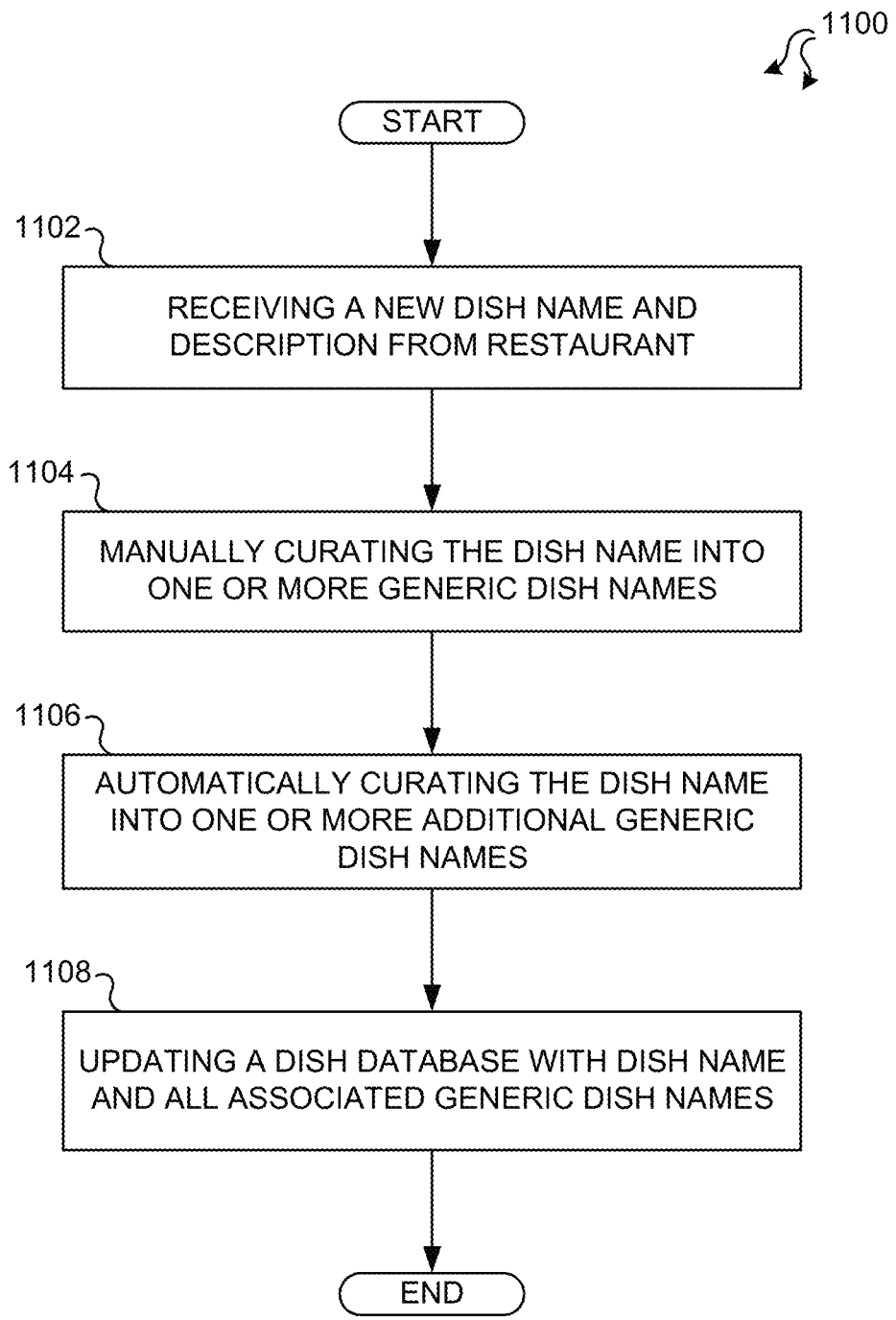
FIG. 11 is a flowchart that shows an exemplary embodiment of a method that receives specific dish names, generates associated generic dish names, and updates the dish database with all names for the dish.

FIG. 11 shows an exemplary embodiment of a method 1100 performed by the DRM circuit 900 that receives specific dish names, generates associated generic dish names, and updates the dish database with all names for the dish.

At block 1102, a new dish name and associated description is received from a restaurant. For example, the dish name and associated description may include an ingredients list and other descriptive information about the dish. The dish information is received from the restaurant manager through the user interface circuit 904.

At block 1104, the dish name and information undergo a manual curation process to generate generic dish names. For example, the processing circuit 902 provides the dish information to the restaurant administration and/or the DRM administration using the user interface 904. One or both of these entities manually provides generic names for the dish.

At block 1106, the dish name and information undergo an automated (ML/AI) curation process to generate generic dish names. For example, the processing circuit 902 performs the functions of the AI system shown in FIGS. B-C to generate generic names for the dish.

At block 1108, the dish name and all the generated generic names are stored in a dish database. For example, the processing circuit 902 stores the dish names in the dish database maintained in the memory 908.

It should be noted that the method 1100 is exemplary and that changes, additions, rearrangements, deletions, and/or modifications of the operations are within the scope of the exemplary embodiments.

Figure 12:
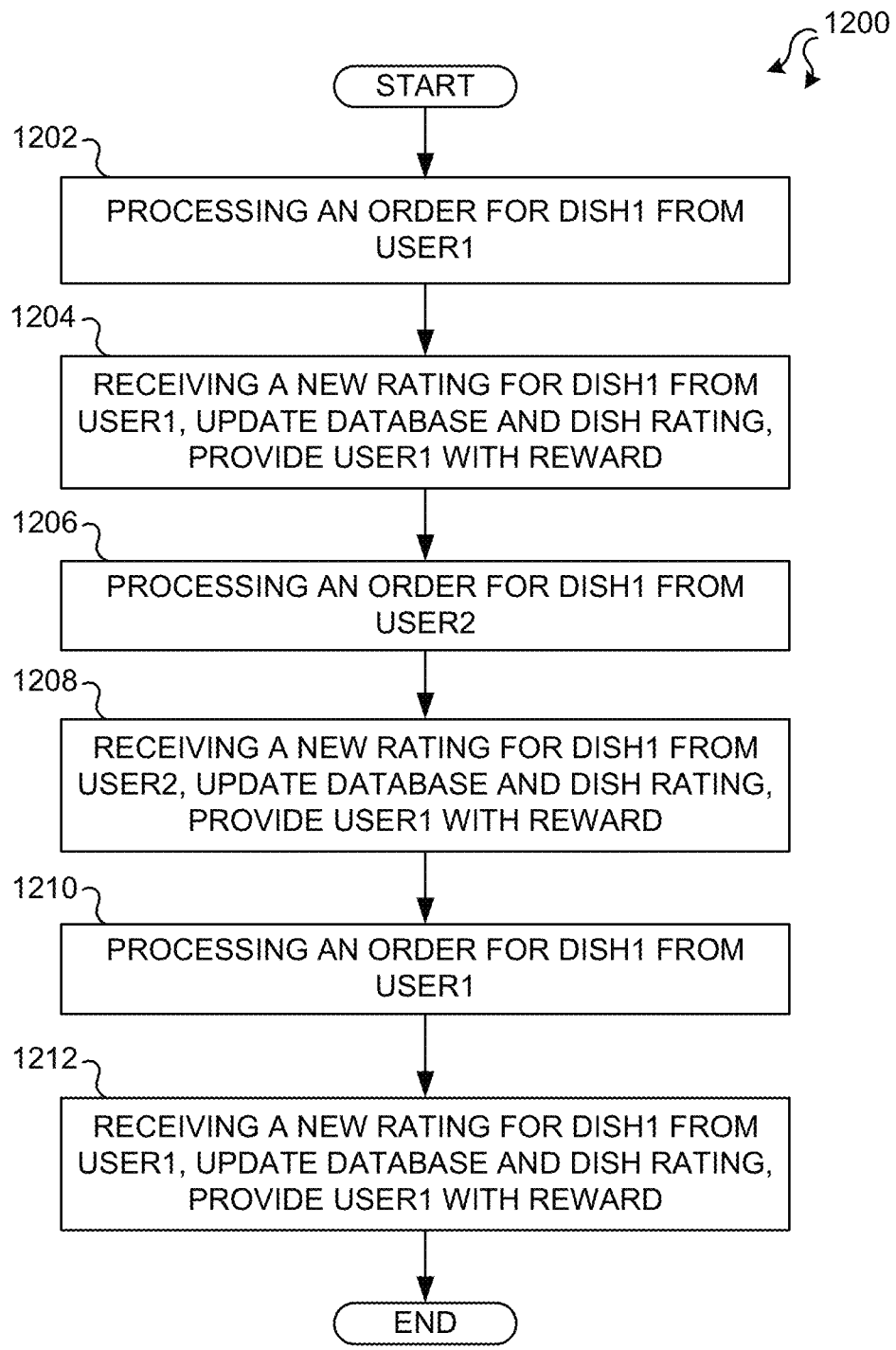
FIG. 12 is a flowchart that shows an exemplary embodiment of a method that receives several user ratings for the same dish and updates the overall dish rating with each received rating.

FIG. 12 shows an exemplary embodiment of a method 1200 performed by the DRM circuit 900 that receives several user ratings for the same dish and updates the overall dish rating with each received rating.

At block 1202, an order for dish1 is processed for user1. For example, user1 communicates with the processing circuit 902 through the user interface 904 to place an order for dish1. The processing circuit 902 processes the order by forwarding the order to a particular restaurant using the interface 904 and sending payment information to the financial network using the interface 906.

At block 1204, a new numeric rating for dish1 is received from user1. The processing circuit 902 uses the new rating to update the dish database and overall dish1 rating in the memory 908. A reward is provided to user1 for providing the new rating. For example, the processing circuit 902 adds the reward to the reward database.

At block 1206, an order for dish1 is processed for user2. For example, a second user orders dish1 and the processing circuit 902 processes this order in the same way as user1's order was processed.

At block 1208, a new numeric rating for dish1 is received from user2. The processing circuit 902 uses the new rating to update the dish database and overall dish1 rating in the memory 908. A reward is provided to user2 for providing the new rating. For example, the processing circuit 902 adds the reward to the reward database.

At block 1210, another order for dish1 is processed for user1. For example, user1 communicates with the processing circuit 902 through the user interface 904 to place another order for dish1. The processing circuit 902 processes the order by forwarding the order to a particular restaurant using the interface 904 and sending payment information to the financial network using the interface 906.

At block 1212, a new numeric rating for dish1 is received from user1. The new rating is used to update the dish database and overall dish1 rating and a reward is provided to user1 for providing the new rating. Thus, user1 is able to order and review the same dish multiple times and each time provide a new user rating for the dish. Each user rating is used to update the overall rating for the dish.

It should be noted that the method 1200 is exemplary and that changes, additions, rearrangements, deletions, and/or modifications of the operations are within the scope of the exemplary embodiments.

Figure 13:
FIG. 13 is a diagram that shows a user dashboard screen generated by the DRM system and displayed by a desktop client.

FIG. 13 is a diagram that shows a user dashboard screen 1300 generated by the DRM system 104 and displayed by a desktop client. The user dashboard 1300 comprises a user profile window 1302, credits window 1304, order history window 1306, favorites window 1308 and ratings and review window 1310.

Figure 14:
FIG. 14 is a diagram that shows a dish search listing screen generated by the DRM system and displayed by a desktop client.

FIG. 14 is a diagram that shows a dish search listing screen 1400 generated by the DRM system 104 and displayed by a desktop client. The search listing 1400 comprises a first spaghetti dish 1402 and associated add-on dish 1404, and a second spaghetti dish 1406 and associated add-on dish 1408.

Figure 15:
FIG. 15 is a diagram that shows a restaurant search listing screen generated by the DRM system and displayed by a desktop client.

FIG. 15 is a diagram that shows a restaurant search listing screen 1500 generated by the DRM system 104 and displayed by a desktop client. The search listing 1500 shows a first café 1502 and a second café 1504 that are within a specific geographic region.

Figure 16:
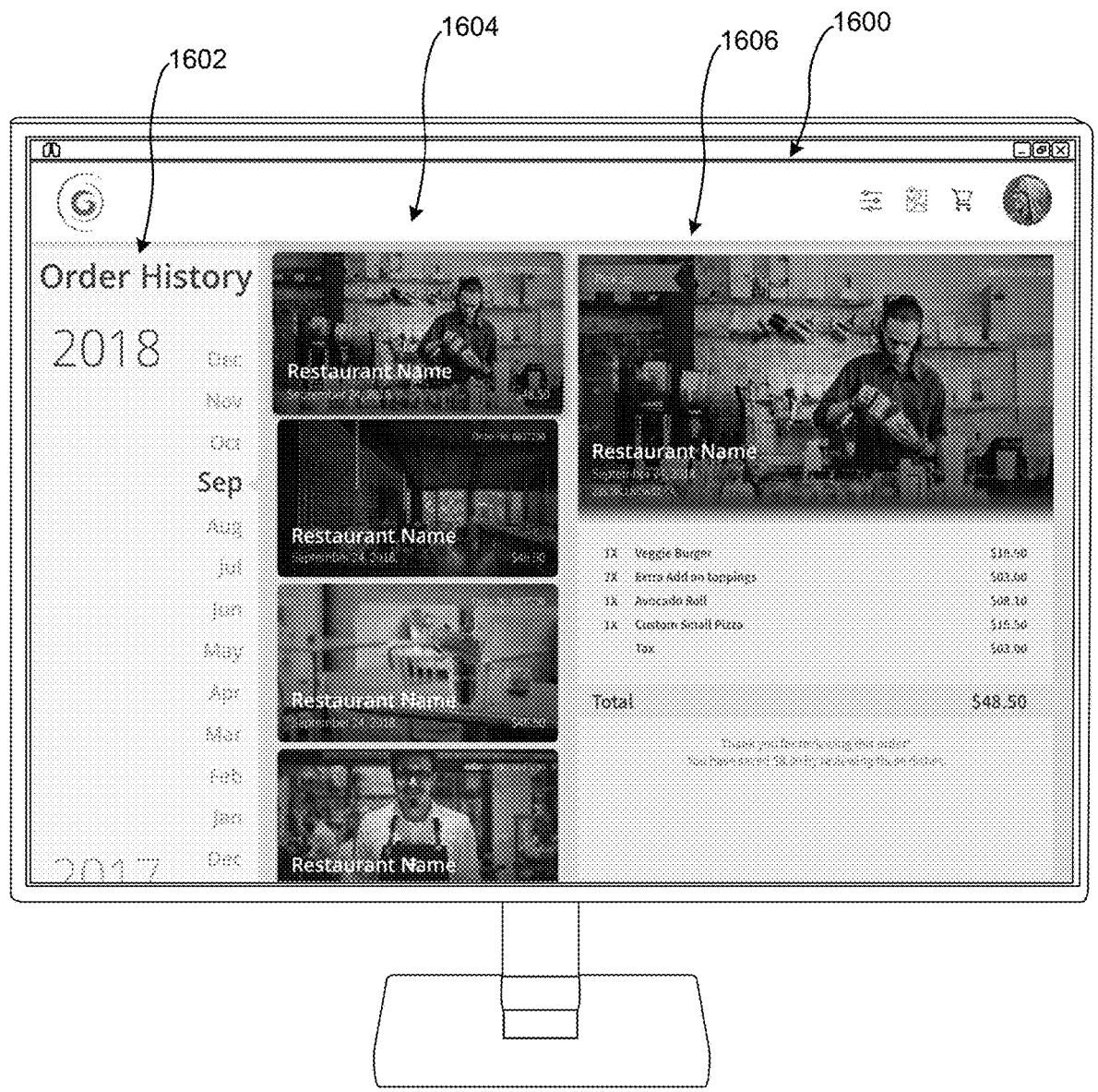
FIG. 16 is a diagram that shows an order history screen generated by the DRM system and displayed by a desktop client.

FIG. 16 is a diagram that shows an order history screen 1600 generated by the DRM system 104 and displayed by a desktop client. The order history 1600 comprises a date selection window 1602 and a restaurant selection window 1604. The restaurant selection window 1604 shows a list of restaurants from which dishes were ordered during the selected dates. The order history 1600 also comprises a detailed restaurant window 1606 that provides details of specific orders from a selected restaurant.

Figure 17:
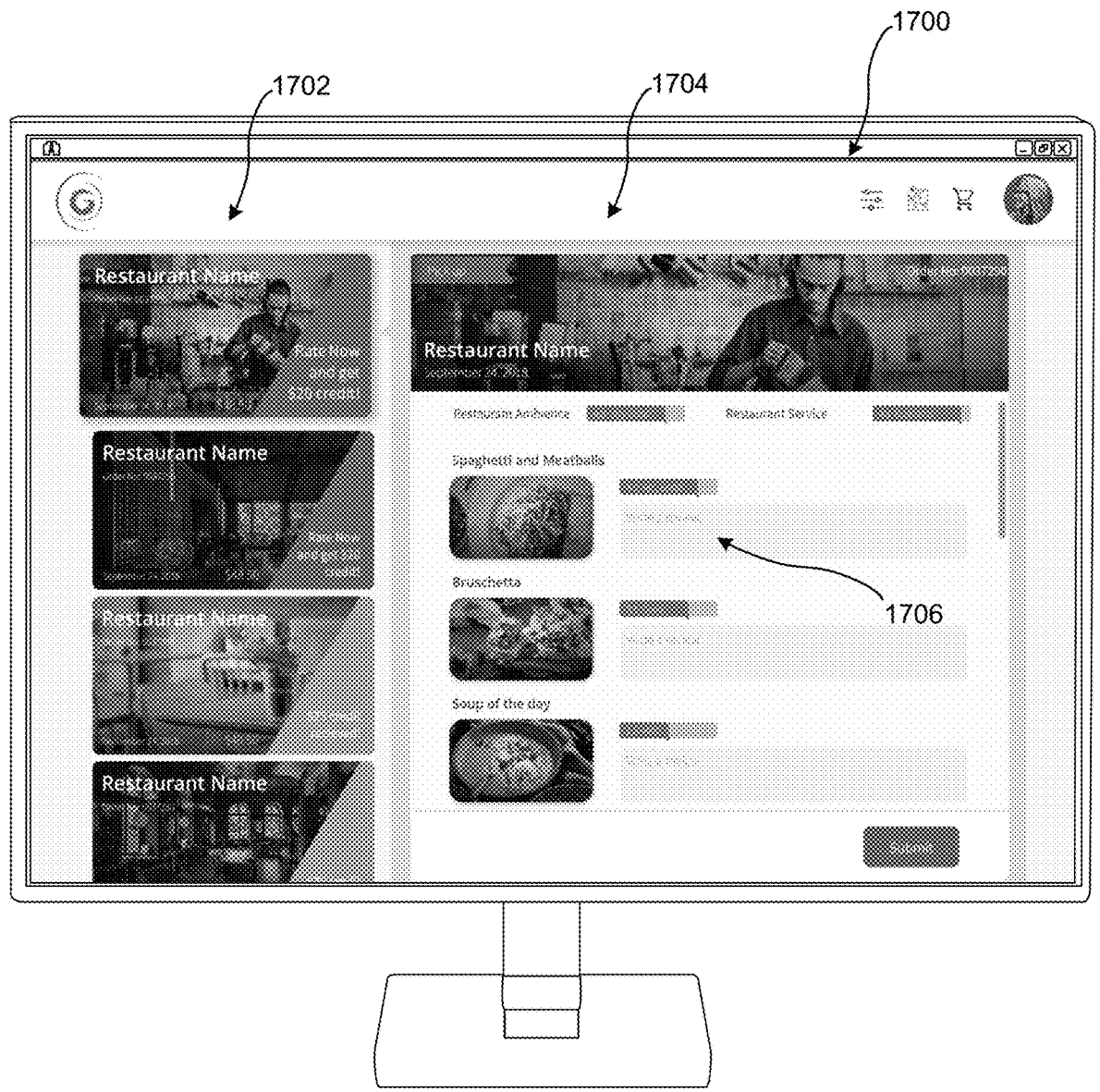
FIG. 17 is a diagram that shows a rating and review screen generated by the DRM system and displayed by a desktop client.

FIG. 17 is a diagram that shows a rating and review screen 1700 generated by the DRM system 104 and displayed by a desktop client. The screen 1700 comprises a restaurant selection window 1702 and a detailed information window 1704 that displays information about the selected restaurant. The information window 1704 allows users to input numeric ratings 1706 for specific dishes provided by the selected restaurant.

Figure 18:
FIG. 18 is a diagram that shows a dish review screen generated by the DRM system and displayed by a desktop client.

FIG. 18 is a diagram that shows a dish review screen 1800 generated by the DRM system 104 and displayed by a desktop client. The dish review 1800 comprises a dish identifier section 1802 and dish review comments 1804.

Figure 19:
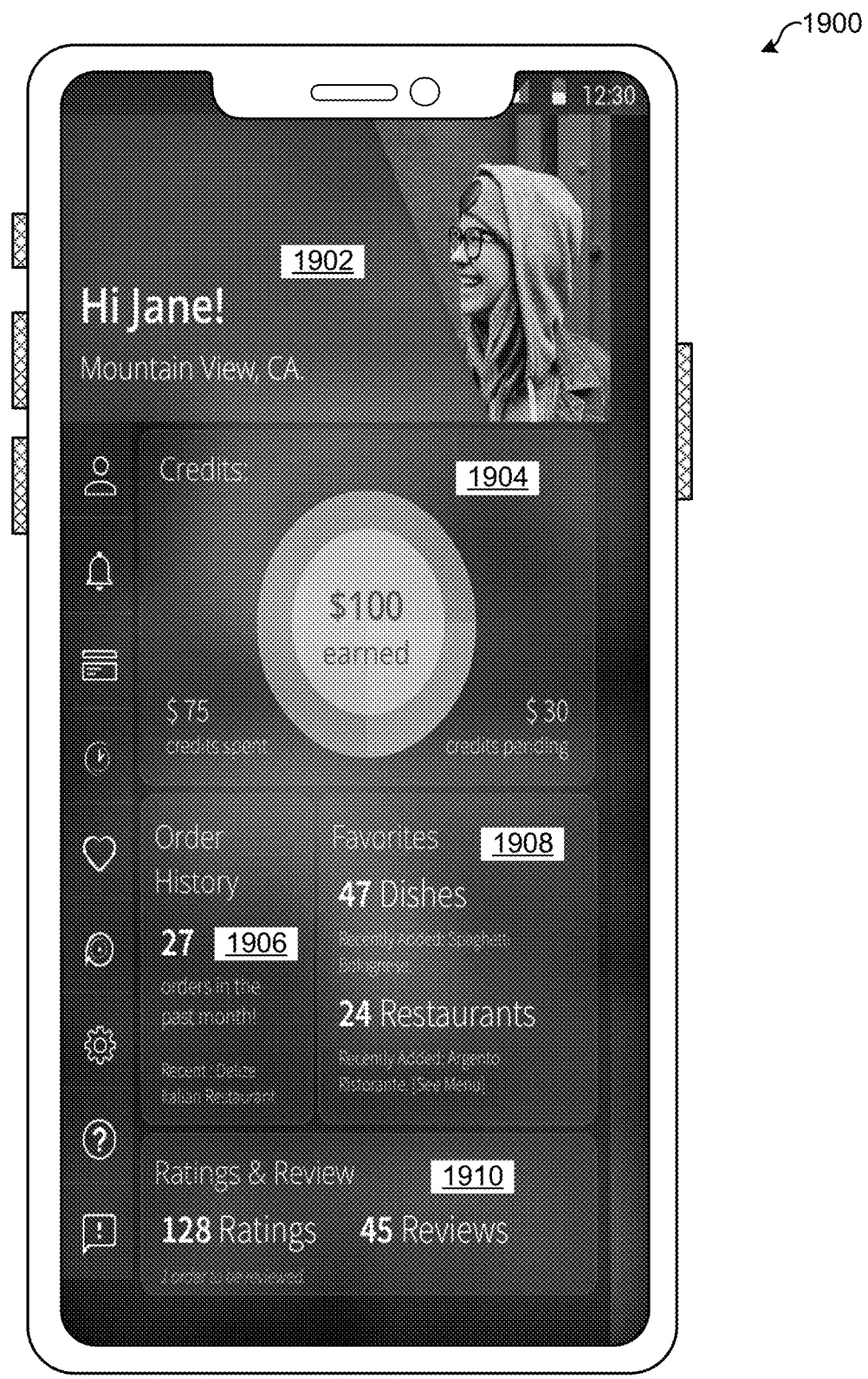
FIG. 19 is a diagram that shows a user dashboard screen generated by the DRM system and displayed by a mobile client.

FIG. 19 is a diagram that shows a user dashboard screen 1900 generated by the DRM system 104 and displayed by a mobile client. The dashboard 1900 includes a user identifier window 1902, credits window 1904, order history window 1906, a user favorites window 1908, and ratings and review window 1910.

Figure 20:
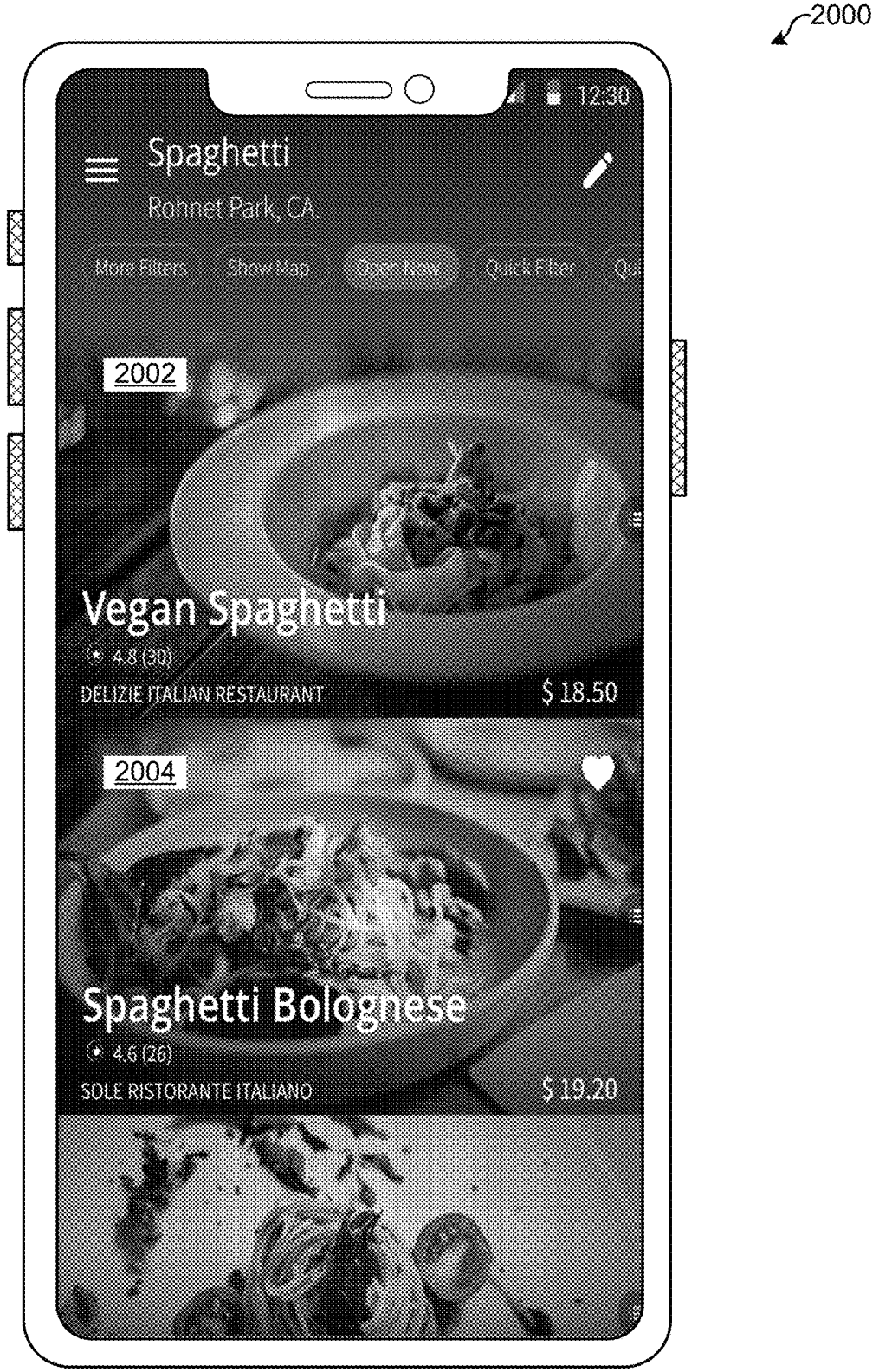
FIG. 20 is a diagram that shows a dish search listing screen generated by the DRM system and displayed by a mobile client.

FIG. 20 is a diagram that shows a dish search listing screen 2000 generated by the DRM system 104 and displayed by a mobile client. The search listing 2000 presents a listing of spaghetti dishes in a particular geographic region. The search listing includes a first spaghetti dish 2002 and a second spaghetti dish 2004 that are available in the selected region. Additional dishes can be seen by scrolling the display.

Figure 21:
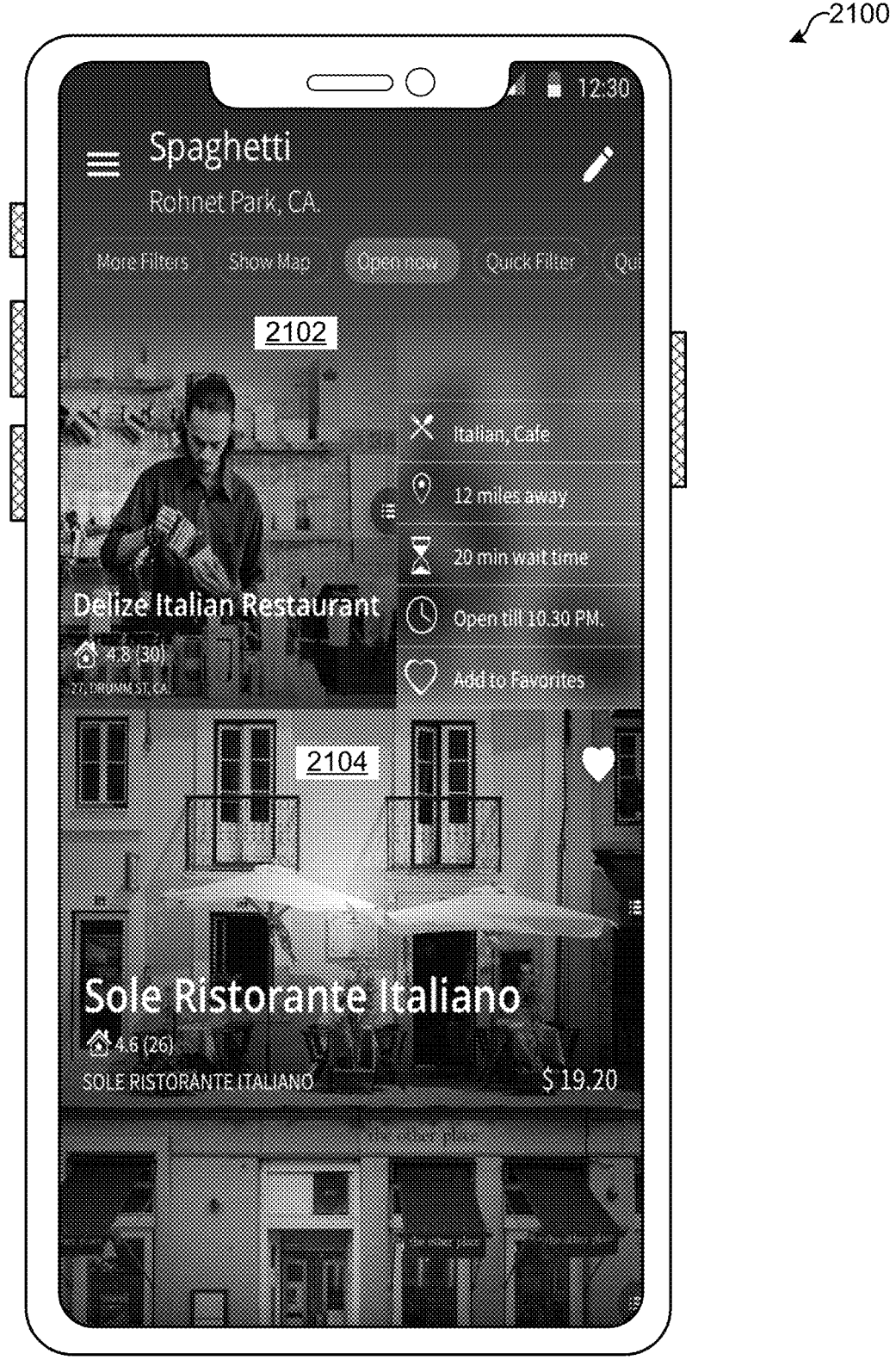
FIG. 21 is a diagram that shows a restaurant search listing screen generated by the DRM system and displayed by a mobile client.

FIG. 21 is a diagram that shows a restaurant search listing screen 2100 generated by the DRM system 104 and displayed by a mobile client. The restaurant search listing 2100 presents a listing of restaurants in a particular geographic region that have spaghetti dishes. The search listing includes a first restaurant 2102 and a second restaurant 2104 that are available in the selected region. Additional restaurants can be seen by scrolling the display.

Figure 22:
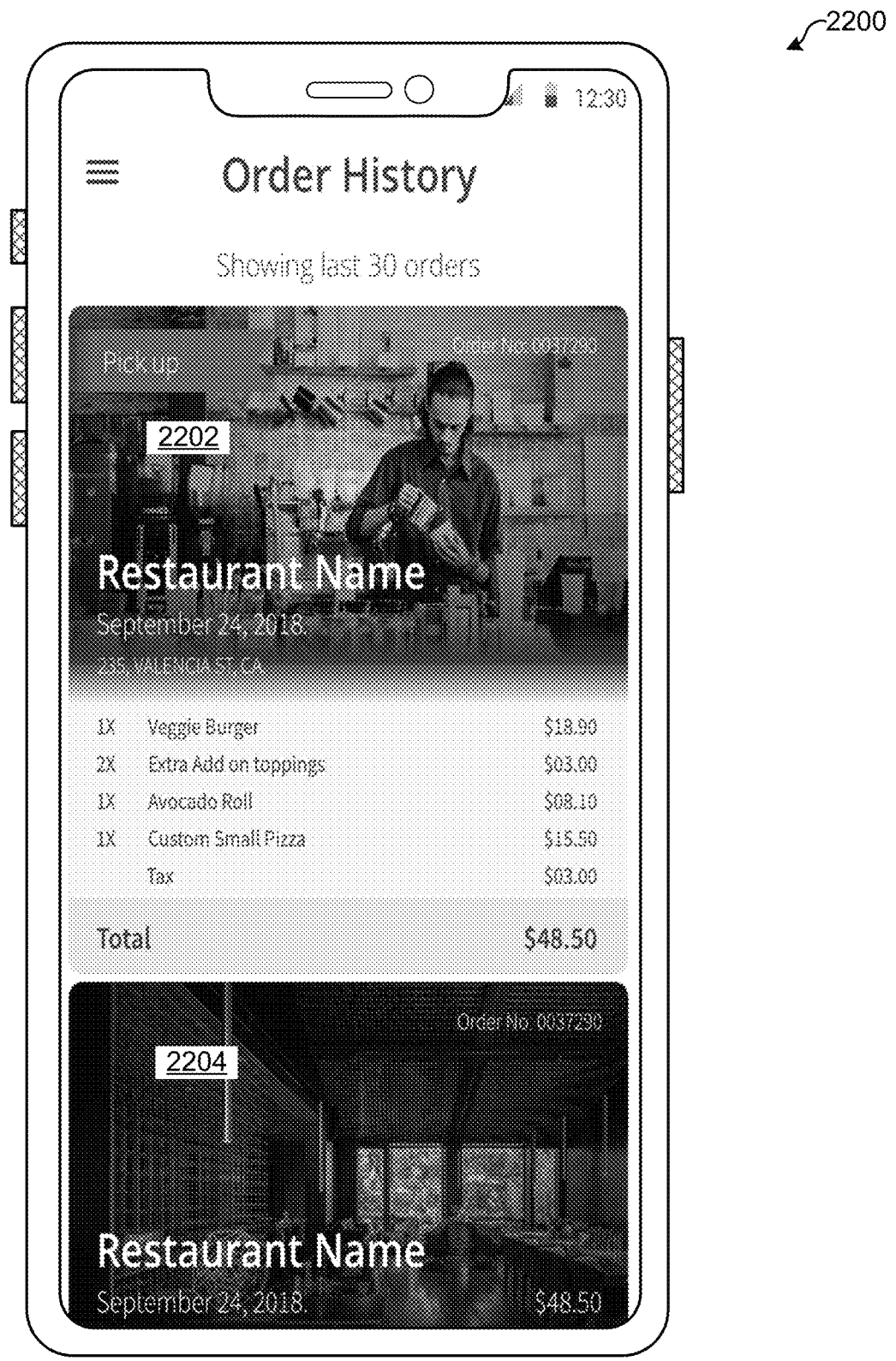
FIG. 22 is a diagram that shows an order history screen generated by the DRM system and displayed by a mobile client.

FIG. 22 is a diagram that shows an order history screen 2200 generated by the DRM system 104 and displayed by a mobile client. The order history 2200 includes a first order history 2202 and a second order history 2204. Additional order histories can be seen by scrolling the display.

Figure 23:
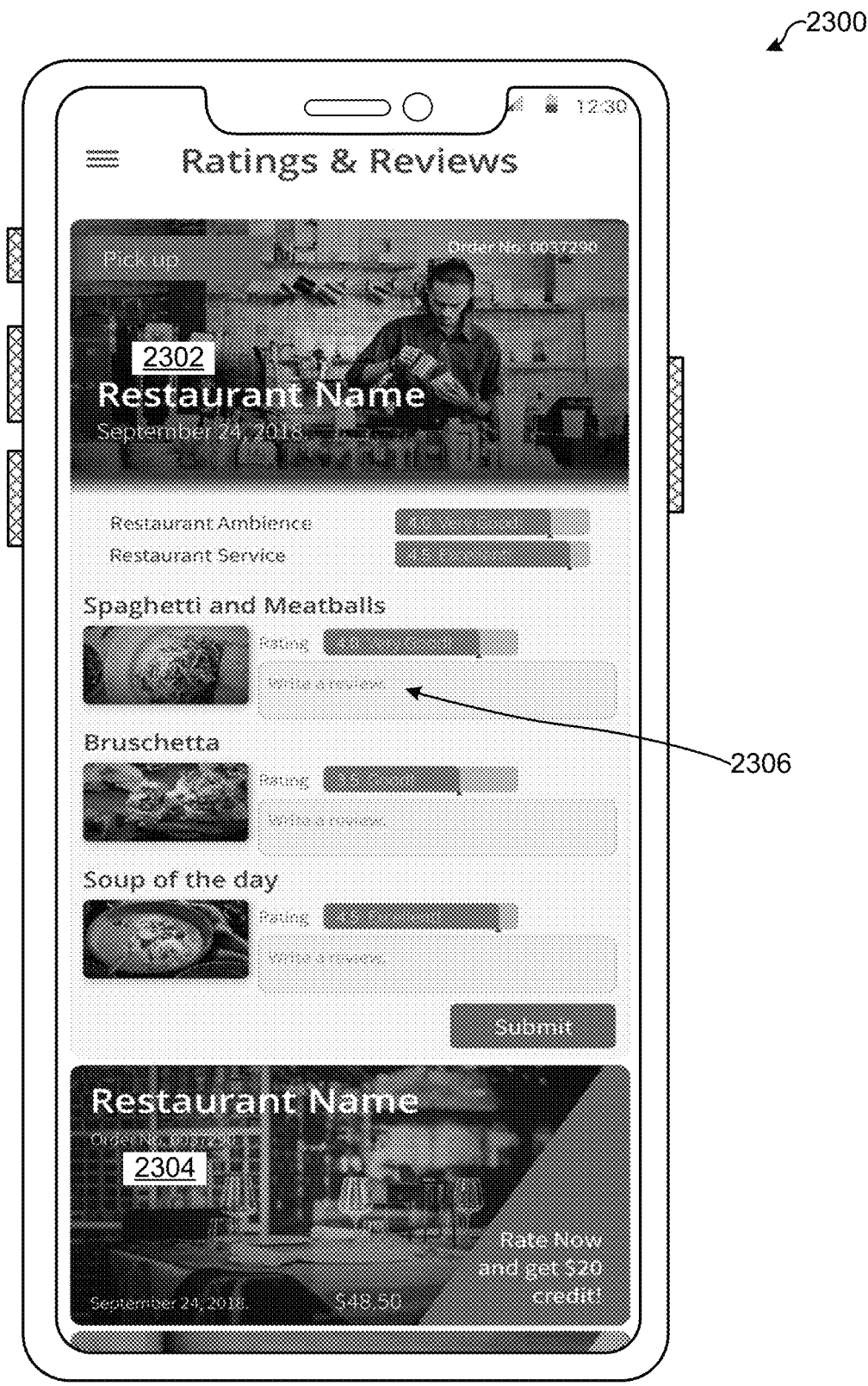
FIG. 23 is a diagram that shows a rating and review screen generated by the DRM system and displayed by a mobile client.

FIG. 23 is a diagram that shows a rating and review screen 2300 generated by the DRM system 104 and displayed by a mobile client. The rating and review screen shot 2300 includes ratings and reviews for a first restaurant 2302 and a second restaurant 2304. Additional order restaurant ratings and reviews can be seen by scrolling the display. The rating and reviews for each restaurant includes identification of dishes and associated ratings, as indicated at 2306. Additional restaurant ratings and reviews can be seen by scrolling the display.

Figure 24:
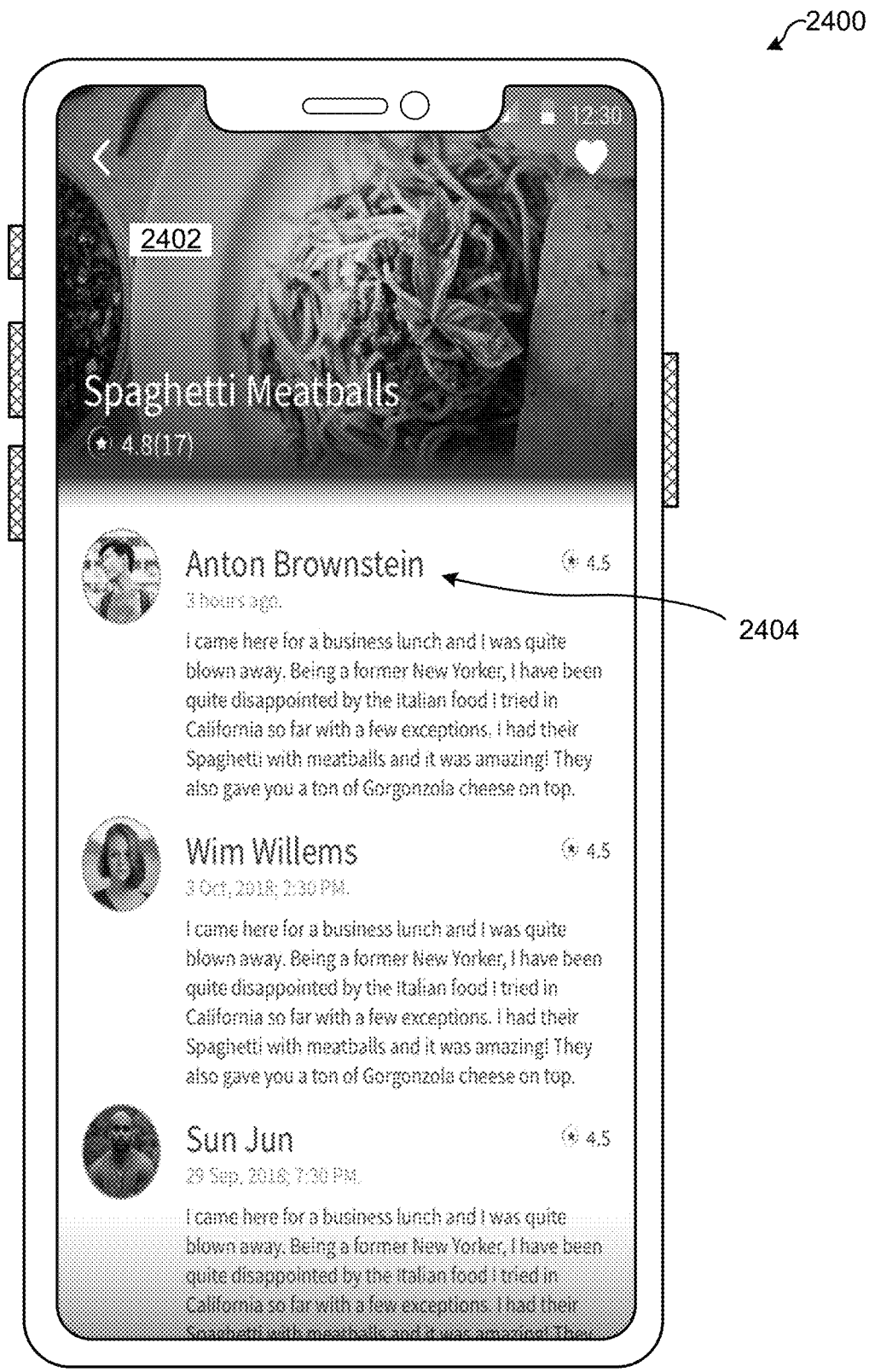
FIG. 24 is a diagram that shows a dish review screen generated by the DRM system and displayed by a mobile client.

FIG. 24 is a diagram that shows a dish review screen 2400 generated by the DRM system 104 and displayed by a mobile client. The dish review screen shot 2400 includes a dish identification 2402 and associated ratings and comments 2404 for each dish. Additional dish ratings and reviews can be seen by scrolling the display.

Although certain specific exemplary embodiments are described above in order to illustrate the invention, the invention is not limited to the specific embodiments. Accordingly, various modifications, adaptations, and combinations of various features of the described embodiments can be practiced without departing from the scope of the invention as set forth in the claims.

What is claimed is:

1. A method performed by a computer system, the method comprising:
   maintaining a database of existing orderable dishes each having an associated numeric rating, wherein the existing orderable dishes are provided by two or more food providers;
   performing a curation process comprising:

receiving information about the existing orderable dishes at an input layer of nodes that are part of a neural network; and processing the information at the input layer of nodes to generate generic dish names at an output layer of nodes that are part of the neural network, and wherein each of the generic dish names generated during the curation process corresponds to one or more orderable dishes available from various food providers;

storing the generic dish names in the database;

receiving selection criteria from a user;

determining one or more selected orderable dishes based on a search of the database using the selection criteria, wherein the selection criteria is matched to at least one of the existing orderable dishes and the generic dish names;

presenting the selected orderable dishes and their associated numeric rating to the user, wherein at least two of the existing orderable dishes presented are from different food providers and are simultaneously presented within a selection window rendered on a display;

processing an order for one or more selected dishes, wherein the one or more selected dishes in the order are provided by one or more food providers;

querying the user for a numeric dish rating for each of the one or more selected dishes, wherein the querying of the user for the numeric dish rating occurs after the one or more selected dishes have been ordered through the computer system and delivered to the user, and wherein the user is logged into the computer system when providing the numeric dish rating; and updating the database with the numeric dish rating for each of the one or more selected dishes.

2. The method of claim 1, further comprising: providing a reward to the user for providing the numeric dish ratings for the one or more selected dishes that are ordered and consumed.

3. The method of claim 2, wherein the reward is an item selected from a group comprising a discount applied to subsequent orders made from any existing dishes of any existing menu of a food provider in the database, a financial credit to a financial account associated with the user, a gift card, a prepaid debit card, and a transfer of currency to a digital wallet of the user.

4. The method of claim 1, wherein the selection criteria comprises at least one element taken from a group comprising existing dish name, existing dish ratings, dish ingredients, geographic region, and proximity of the food provider to the user.

5. The method of claim 1, wherein the processing of the order is performed without any involvement of the user.

6. The method of claim 1, wherein the operations of the method are performed by web-based or mobile applications.

7. The method of claim 6, wherein the web-based or mobile applications are distributed across a network such that the database is stored in a first memory separate from a second memory that stores instructions that perform the operations of the method.

8. The method of claim 1, wherein the database includes all the existing dishes and their updated ratings provided by a multitude of food providers.

9. The method of claim 1, wherein the operation of updating causes a food provider's rating to be updated together with ratings for the one or more selected dishes that are ordered.

10. The method of claim 1, wherein the operation of presenting and the operation of querying are performed through a desktop client or through a mobile client.

11. The method of claim 1, wherein the operations of the method are performed by a dish rating and management (DRM) system that is managed by an entity that is separate from food providers that provide the dishes maintained in the database.

12. The method of claim 11, further comprising providing a commission to the entity, and wherein the commission is a fixed or variable percentage of the order.

13. An apparatus, comprising:
a memory that maintains a database of existing orderable dishes and existing menus of a multitude of food providers and numeric ratings of the orderable dishes and the food providers;
a user interface that provides communications with a user;
a neural network configured to receive information about the existing orderable dishes at an input layer of nodes, process the information at the input layer of nodes to generate generic dish names at an output layer of nodes, and store the generic dish names in the database, wherein each of the generic dish names generated using the neural network corresponds to one or more orderable dishes available from various food providers; and
a processing circuit configured to:
receive selection criteria from a user;
identify selected dishes from the memory based on the selection criteria;
present the selected dishes and their ratings to the user;
process an order from the user for the selected dishes, wherein the one or more selected dishes in the order are provided by one or more food providers;
query the user for new numeric dish ratings for the selected dishes that are ordered and consumed, wherein the query of the user for new numeric dish ratings occurs after the one or more selected dishes have been ordered and delivered to the user, and wherein the user is logged in the apparatus when providing new numeric dish ratings; and
update the database with the new numeric dish ratings for the selected dishes that are ordered and consumed.

14. The apparatus of claim 13, wherein the processing circuit provides a reward to the user for the numeric dish ratings that the user provides.

15. The apparatus of claim 13, wherein the selection criteria comprise at least one of existing dish name, existing dish rating, existing dish ingredients, geographic region, most popular dish, cuisine name, dietary restrictions, and proximity of the food provider to the user.

16. The apparatus of claim 13, wherein the reward is selected from a group comprising a discount applied to subsequent orders made from any of the existing dishes from any of the multitude of food providers in the database, a financial credit to a financial account associated with the user, a gift card, a prepaid debit card, and an amount of currency transferred to a digital wallet of the user.

17. The apparatus of claim 13, wherein the apparatus is a network device that communicates with mobile or desktop clients across a network.

18. The apparatus of claim 17, wherein the network device is: (1) implemented entirely in hardware as an integrated circuit, (2) implemented in a combination of hardware and software, or (3) implemented entirely in software as part of a stand-alone server, distributed across multiple servers, or realized using serverless architectures.

19. A system, comprising:

a neural network configured to receive information about dishes at an input layer of nodes, process the information at the input layer of nodes to generate generic dish names at an output layer of nodes, and store the generic dish names in a database, wherein the database stores dishes from two or more food providers and associated ratings, and wherein each of the generic dish names generated using the neural network corresponds to dishes stored in the database and available from various food providers; and means for presenting existing dishes of a food provider's menu and associated numeric dish ratings of the dishes and the food provider to a user based on one or more selection criteria, wherein the means is also for processing an order for selected dishes provided by one or more food providers, wherein the means is also for querying the user for numeric dish ratings for selected, ordered, and consumed dishes, wherein the user is logged into the system when providing numeric dish ratings, and wherein the means is also for updating the database with the new updated numeric ratings of the dishes and the food provider.

20. The system of claim 19, wherein the means comprises a processor and a user interface of a dish rating and management (DRM) system.

21. The system of claim 19, wherein the means for presenting is also for providing a reward to the user in response to receiving the numeric dish ratings.

\* \* \* \* \*